US007086946B2

(12) United States Patent
Yoshida

(10) Patent No.: US 7,086,946 B2
(45) Date of Patent: Aug. 8, 2006

(54) GAME METHOD USING NETWORK, SERVER EXECUTING THE GAME METHOD, AND STORAGE MEDIUM STORING PROGRAM EXECUTING THE GAME METHOD

(75) Inventor: Shuichiro Yoshida, Osaka (JP)

(73) Assignee: Aruze Co., LTD, Tokyo (JP)

( * ) Notice: Subject to any disclaimer, the term of this patent is extended or adjusted under 35 U.S.C. 154(b) by 200 days.

(21) Appl. No.: 10/143,047

(22) Filed: May 10, 2002

(65) Prior Publication Data

US 2002/0173358 A1 Nov. 21, 2002

(30) Foreign Application Priority Data

May 18, 2001 (JP) ...................................... 2001-149570

(51) Int. Cl.
*A63F 13/00* (2006.01)

(52) U.S. Cl. ............................. 463/23; 463/42; 463/31

(58) Field of Classification Search .................. 463/23, 463/30, 31, 40, 42, 1
See application file for complete search history.

(56) References Cited

U.S. PATENT DOCUMENTS

| | | | | | |
|---|---|---|---|---|---|
| 4,521,014 | A | * | 6/1985 | Sitrick | 463/31 |
| 4,710,873 | A | * | 12/1987 | Breslow et al. | 463/31 |
| 5,553,864 | A | * | 9/1996 | Sitrick | 463/31 |
| 5,611,037 | A | * | 3/1997 | Hayashi | 345/442 |
| 6,142,874 | A | * | 11/2000 | Kodachi et al. | 463/20 |
| 6,322,451 | B1 | | 11/2001 | Miura | |
| 6,540,606 | B1 | | 4/2003 | Matsukata | |
| 6,556,775 | B1 | * | 4/2003 | Shimada | 386/121 |

FOREIGN PATENT DOCUMENTS

| | | | |
|---|---|---|---|
| JP | 2000-011165 | A | 1/2000 |
| JP | 2000-030083 | A | 1/2000 |
| JP | 2000-033184 | A | 2/2000 |
| JP | 2000-061145 | A | 2/2000 |
| JP | 2000-107454 | A | 4/2000 |
| JP | 2000-107457 | A | 4/2000 |
| JP | 2000-112711 | A | 4/2000 |
| JP | 2000-115062 | A | 4/2000 |
| JP | 2000-126455 | | 5/2000 |
| JP | 2000-126455 | A | 5/2000 |
| JP | 2000-334173 | A | 12/2000 |
| JP | 2000-339073 | A | 12/2000 |
| JP | 2000-342851 | A | 12/2000 |
| JP | 2001-087559 | A | 4/2001 |
| JP | 2001-104634 | A | 4/2001 |
| KR | 1999-0064794 | | 8/1999 |
| KR | 2000-54783 | A | 9/2000 |
| KR | 2001-35289 | A | 5/2001 |

* cited by examiner

*Primary Examiner*—Corbett B. Coburn

(57) ABSTRACT

On a server, face image is registered and updated according to the player's skill-level. Specifically, as personal information, not only registration of user's address, name, or pen name, but also face information is registered and changed according to the game result. Therefore, this permits a quick visual recognition of the previous game result. As the result, when performing a battle game between terminals, the player can understand the competitor's skill-level.

24 Claims, 59 Drawing Sheets

FIG. 5

CONCEPT OF PARLOR PART

"PARLOR" CONCEPT

TO PROVIDE NOT ONLY *Pachinko / Pachislo* PLAYS BUT ALSO PLAY ESSENCE AS PARLOR AND COMMUNICATION WITH OTHERS

POINT

① PARLOR GIVING IMPRESSION THAT MANY PEOPLE JOIN COINCIDENTLY

- PARLOR STYLE EASY TO SEE SITUATIONS OF OTHER MACHINES AND PEOPLE

SITUATIONS OF PEOPLE AND MACHINES OF SAME PARLOR (SAME ISLAND) CAN BE SEEN AT A LOOK, THUS CREATING ATMOSPHERE OF REAL PARLOR

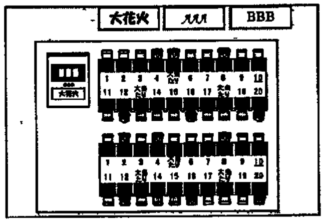

UNLIKE PLAY ALONE, YOU CAN EXPERIENCE PRESENCE OF PLAYING WITH MANY PEOPLE COINCIDENTLY

② COMMUNICATION WITH PEOPLE THROUGH *Pachislo*

- CHAT SYSTEM AND VARIOUS COMMUNITIES

③ EXPERIENCE ALL RECENT *Pachislo* MACHINES SIMILAR TO ACTUAL MACHINES

- PLAY FROM PAST FAMOUS MACHINES TO UP-TO-DATE MACHINES WHILE PEFERRING TO GUIDE

③ PARLORS PROVIDING VARIOUS PLAYS

- VARIOUS PARLORS FROM REGULAR *Pachislo* TO QUASI-*Pachislo*

FIG. 7

WHOLE SYSTEM

MERITS OF WHOLE SYSTEM

*Pachislo* PLAY IS REFLECTED IN VARIOUS THINGS

POINT

① COINS OBTAINED ON SITE ARE REFLECTED IN RANKING

·PROVIDED COINS IN *Pachislo* ON SITE ARE REFLECTED IN OVERALL RANKINGS

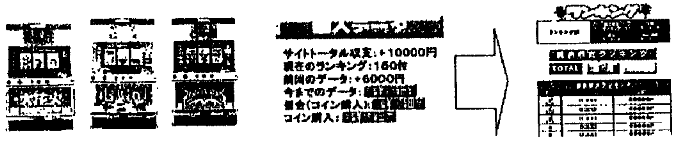

VARIOUS RANKINGS
·BALANCE RANKING
·PROVIDED-COIN RANKING
·Max-HOLDING RANKING
·DEBT RANKING

PERSONAL DATA AFTER PLAYING Net-*Pachislo* ON SITE IS REFLECTED IN OVERALL RANKINGS ② TALK WITH *Pachislo* MATES ON CHAT ·EVERY PARLOR ON SITE HAS CHAT ROOM, ENABLING TO TALK WITH MATES AT ANY TIME AND ASK THEM QUESTIONS

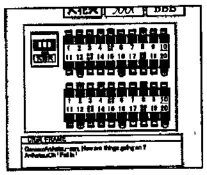

YOU CAN TALK WITH ANY MATE WITHIN THE SAME PARLOR (SAME ISLAND) !

FIG. 9

WHOLE SYSTEM

POINT

③ YOUR CHARACTER CHANGES BY DATA OBTAINED AFTER YOU PLAY ON SITE !

- YOUR CHARACTER AND *Pachislo* LEVEL CHANGE BY DATA OF YOUR OF YOUR *Pachislo* PLAY ON SITE, PLAY TIME, AND BALANCE.

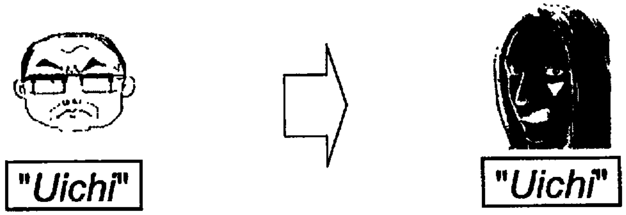

OLD-MAN SLOTTER "*Uichi*" WHEN LOSING

PRO-SLOTTER "*Uichi*" WHEN WINNING

ELEMENTS REFLECTED
- PROVIDED COIN AND BALANCE
- NUMBER OF PLAYS AND MACHINE MODEL
- RATE OF OBTAINING EACH BONUS POINTS
- PULL STRENGTH, etc.

④ MANY CHARACTERS APPEAR IN PARLOR

FIG. 10

BATTLE ROOM

FEATURES OF BATTLE ROOM

**YOU CAN TRY AND PLAY VARIOUS *Pachislo* MACHINES IN REAL PARLOR ATMOSPHERE !**

POINT

① RANKING CHANGES IN REAL TIME WITHIN SAME PARLOR

·MOMENTARILY-CHANGED RANKING MAKES EXCITED BATTLE

| | |
|---|---|
| ↑USER3 | 1200PIECES |
| ↓USER4 | 1100PIECES |
| →USER1 | 700PIECES |
| ↑USER2 | 690PIECES |
| ↓USER5 | 350PIECES |

REAL-TIME RANKING THAT CHANGES MOMENTARILY WITHIN HALL

THERE IS RANKING TO BATTLE FOR TOTAL BALANCE AND PROVIDED COINS!

② YOU CAN ASK SOMEONE FOR HELP !

·YOU RECEIVE AID OF SOMEONE BY ASKING FOR "OBSERVATION PUSH" IN CHAT ROOM etc.

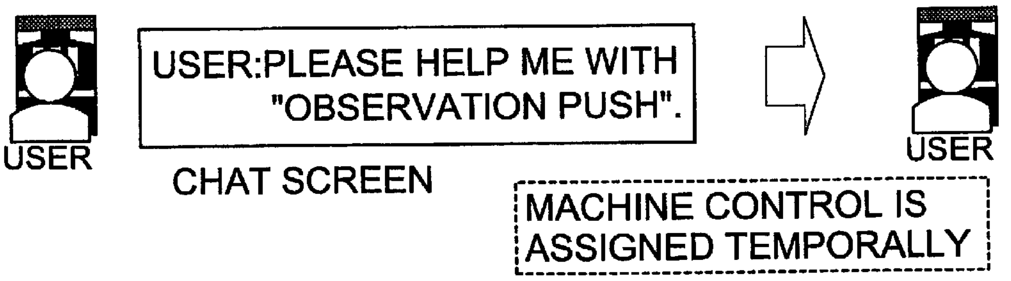

YOU CAN ASK SOMEONE FOR "OBSERVATION PUSH" , OR SHARE THE MACHINE AND HAVE TALK ABOUT ATTACK METHOD!

FIG. 11

FAMOUS MACHINE ROOM

FEATURES OF FAMOUS MACHINE ROOM

YOU CAN PLAY THAT LEGENDARY EXCITING MACHINE !

POINT

① YOU CAN PLAY PAST FAMOUS MACHINES FROM "UNIVERSAL" TO "*ARUZE*".

•PLAYS WITH PAST FAMOUS MASHINES THAT ARE PRACTICALLY NOT SET IN ANY HALLS (PS, NGP, etc)

ONLY THIS FAMOUS MACHINE ROOM CAN PROVIDE EVERY PAST FAMOUS MACHINE !

② YOU CAN FIND HALLS SETTING PAST FAMOUS MACHINES

•HALLS SETTING PAST FAMOUS MACHINES CAN BE SEARCHED BY ACCESSING TO "*Pachi Pachi* Kingdom".

EVENT ROOM

PAIR ROOM

FEATURES OF PAIR ROOM

THERE IS CHANCE TO ENCOUNTER AT PAIR-SLOT MACHINE ON NET

POINT

- FEMALE TAKES INITIATIVE IN PLAY (PARTNER SELECTION, MACHINE SELECTION, etc.)
- PARTNERS BUY COINS SEPARATELY (GIVE AND TAKE IS PROHIBITED) AND BOTH PROVIDED COINS ARE DIVIDED INTO HALVES.

ATTACK ROOM / BEGINNER ROOM

FEATURES OF ATTACK ROOM / BEGINNER ROOM

ACTUAL PRACTICE AND ATTACK WHILE REFERRING TO RECENT ATTACK METHOD AND RUMORED INFORMATION

FIG. 15

LINK WITH *i-mode*

OBJECTS :

USER INDUCTION TO "*Pachi Pachi* Kingdom" AND PROFIT INCREASE IN "*i-mode*" *Pachislo*-SITE"

LINK CONTENTS :

LINK CONTENTS PC SITE : FREE
*i-mode* SITE : CHARGED

① ATTACK INFORMATION

② SETTING HALL INFORMATION
BOTH INFORMATION SHARE DATABASE
(PC SITE EMPHASIZES VISUALIZATION, MORE INFORMATION, AND LINK TO ACTUAL MACHINES.)

③ PERSONAL BALANCE
- STORAGE AND EDITING OF *i-mode* INPUT DATA
- EDITING AND MAKING GRAPH OF PERSONAL BALANCE DATA etc.

| GAME | BONUS POINTS | REMARKS |
|---|---|---|
| 7A | RR | M |
| 180 | 777 | |
| 180 | 777 | |
| 180 | 777 | |
| R2 | RR | |
| R72 | 777 | |
| R59 | RR | |

| | |
|---|---|
| AUG. BALANCE | +25000YEN |
| SEP. BALANCE | -15000YEN |
| OCT. BALANCE | +5000YEN |
| NOV. BALANCE | -10000YEN |
| TOTAL | +5000YEN |

BALANCE BY MONTH

| | |
|---|---|
| *O-HANABI* | +125000YEN |
| *DEL-SOL 2* | +15000YEN |
| Marine Battle | +5000YEN |
| NJ | -100000YEN |
| *Grand-ciel* | +225000YEN |

BALANCE BY MACHINE TYPE

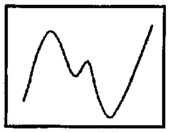

MAKING GRAPH OF EACH DATA

DATA INPUTTED AND STORED ON *i-mode* IS EDITTED AND GRAPHED !

④EC

OUTLINE OF MACHINE SELECTION SCREEN (PARLOR LAYOUT)

MACHINE SELECTION SCREEN (PARLOR LAYOUT)

MACHINE SELECTION SCREEN (PARLOR LAYOUT) IS USED IN SELECTING MACHINE, etc.

FIG. 18

MACHINE SELECTION SCREEN (PARLOR LAYOUT)

DISPLAY CONTENTS:

- "MACHINE TYPE DISPLAY" THAT DISPLAYS THE TYPE OF MACHINE IN DISPLAYED AREA (MACHINE SELECTION SCREEN) CURRENTLY
- "RANKING DISPLAY" THAT DISPLAYS REAL-TIME RANKING WITHIN DISPLAYED AREA
- "USER DISPLAY" THAT DISPLAYS WHETHER THE MACHINE IS NOW USED BY USER
- "MACHINE-TYPE SELECTION ICON" THAT IS USED FOR SELECTING MACHINE TYPE IN DISPLAYED AREA ON "MACHINE SELECTION SCREEN"
- "MACHINE INFORMATION DISPLAY" THAT DISPLAYS MACHINE CONDITIONS (PLAY SCREEN APPEARS BY CLICKING THIS DISPLAY)
- "Chat FRAME" THAT IS USED FOR OBTAINING HALL INFORMATION, COMMUNICATION BETWEEN USERS, etc.

FIG. 19

MACHINE TYPE SELECTION ICON

MACHINE TYPE SELECTION ICON IS USED FOR SELECTING MACHINE TYPE IN AREA DISPLAYED ON MACHINE SELECTION SCREEN

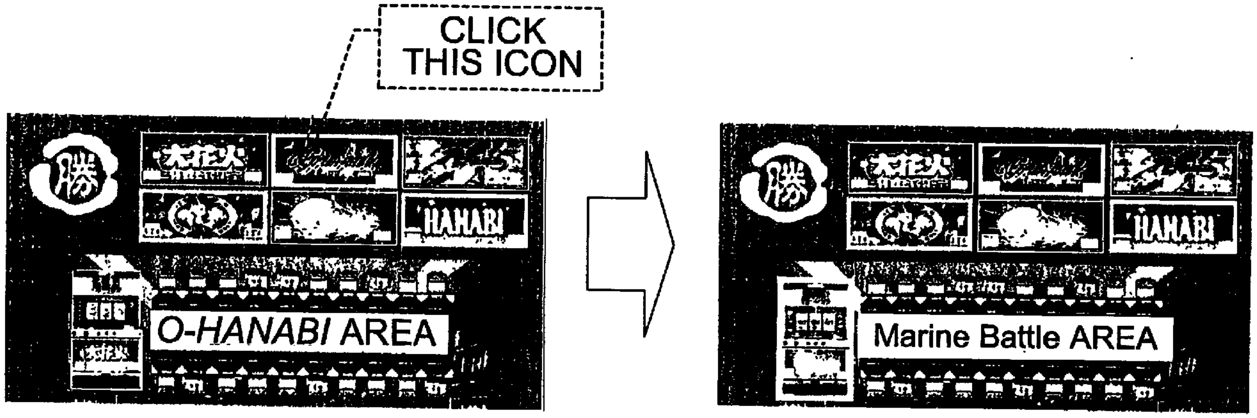

ALTHOUGH "*O-HANABI* AREA" IS NOW DISPLAYED, IF DESIRED, "Marine Battle AREA" APPEARS BY CLICKING "Marine Battle" ICON.

NOTES : THE TYPE OF MACHINE TO WHICH USER IS SITTING DOWN IS NOT CHANGED, BUT USER MOVES TO OTHER AREA (DIFFERENT TYPE MACHINE IS REGARDED AS DIFFERENT MACHINE)

FIG. 20

RANKING

REAL-TIME RANKING WITHIN AREA IS DISPLAYED

| | |
|---|---|
| FIRST PLACE | 123456 PIECES |
| USER NAME (#777 MACHINE) | |
| SECOND PLACE | 123456 PIECES |
| USER NAME (#777 MACHINE) | |
| THIRD PLACE | 123456 PIECES |
| USER NAME (#777 MACHINE) | |

RANKING

·DISPLAY METHOD:
RANKING OF FIRST-TENTH PLACES (UP TO 100TH PLACE IN FUTURE)

·DISPLAY CONTENTS:
"RANKING" IS DECIDED WITHIN PEOPLE USING SAME MACHINE TYPE
"NUMBER OF COINS" SHOWS THE NUMBER OF COINS OBTAINED BY USER
"USER NAME" SHOWS USER'S ENTRY NAME WHEN ENTERRING THE SITE
"MACHINE NUMBER" SHOWS THE NUMBER OF MACHINE USED DURING PLAY

·UPDATE FREQUENCY:
APPROXIMATELY REAL-TIME

FIG. 21

RANKING

DETAILS OF DATA TO BE REFLECTED TO REAL-TIME RANKING (THE NUMBER OF OBTAINED MEDALS) = (PAYOUT MEDALS)*1 - (CREDIT MEDALS)*2

*1 TOTAL MEDALS OBTAINED THROUGH EACH BONUS POINT
*2 TOTAL MEDALS USED IN ALL GAMES
(TOTAL MEDALS USED FOR ROTATING REEL)

Chat

"Chat" IS USED FOR DISPLAYING TALK BETWEEN PLAYERS OR HALL BROADCAST.

·DISPLAY CONTENTS :

"AREA Chat" THAT IS USED IN TALK OR NOTICE WITHIN THE AREA

"ISLAND Chat" THAT IS USED IN TALK BETWEEN LIMITED-NUMBER PLAYERS

"HALL BROADCAST" THAT IS USED TO LET PLAYERS KNOW HALL INFORMATION (e.g. "BIG HIT AT MACHINE NUMER "X" ! )

Chat (CONTENTS CONFIGURATION)

FIG. 25

AREA DISPLAYED ON THIS SCREEN IS OBJECT OF AREA Chat

Chat (AREA Chat)

"AREA Chat" IS USED IN TALK OR NOTICE AMONG ALL PLAYERS.

DISPLAY METHOD:
- FONT: USUALLY ABOUT 10.5 POINTS
- CHARACTER COLOR: RED (ANY COLORS EXCEPT BLACK ARE USABLE)
- SENDER INDICATION: USER NAME AND MACHINE NUMBER ARE INDICATED

| Chat FRAME |
|---|
| *Tsuyucchi* (#123 MACHINE): Please tell me about your great victory. |

OBJECT PLAYER NUMBER:
ALL PLAYERS SITTING TO MACHINES DISPLAYED ON PARLOR LAYOUT (MACHINE SELECTION SCREEN), THAT IS, ALL PLAYERS ON THIS SCREEN

FIG. 26

Chat (ISLAND Chat)

ISLAND Chat IS USED IN TALK BETWEEN LIMITED-NUMBER PLAYERS.

DISPLAY METHOD:

- FONT: USUALLY ABOUT 10.5 POINTS
- CHARACTER COLOR: BLACK
- SENDER INDICATION: USER NAME AND MACHINE NUMBER ARE INDICATED

| Chat FRAME |
|---|
| *Tsuyucchi* (#123 MACHINE): Please tell me about your great victory.<br>*Sudo* (#777 MACHINE): I have seen nothing of "*O-HANABI*" lately.<br>*Yoshi* (#333 MACHINE): I suppose so. "TAROT MASTER" rules the time, I think. |

OBJECT PLAYER NUMBER:

- USERS SITTING IN A ROW WITHIN AREA

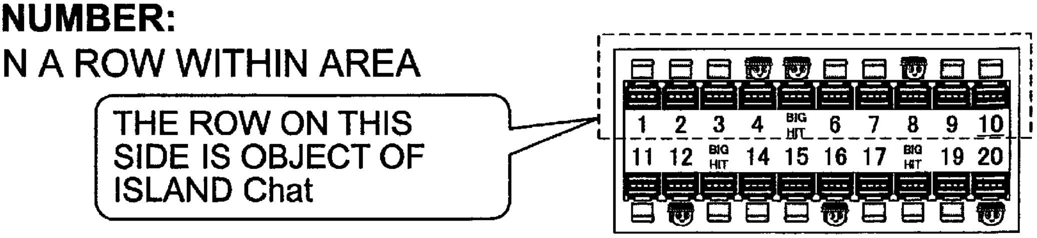

- OBJECT USERS OF ISLAND Chat ARE CHANGEABLE

FIG. 27

Chat (HALL BROADCAST)

HALL BROADCAST IS USED TO LET PLAYERS KNOW HALL INFORMATION etc.

·DISPLAY METHOD
FONT: USUALLY ABOUT 12 POINTS
CHARACTER COLOR: BLACK IN BOLD-FACE
SENDER INDICATION: IN HALL BROADCAST

| Chat FRAME |
|---|
| *Tsuyucchi* (#123 MACHINE): Please tell me about your great victory.<br>*Sudo* (#777 MACHINE): I have seen nothing of "*O-HANABI*" lately.<br>*Yoshi* (#333 MACHINE): I suppose so. "TAROT MASTER" rules the time, I think.<br><br>CONGRATULATIONS !! BIG HIT #1 MACHINE !! |

·OBJECT PLAYER NUMBER:
ALL PLAYER SITTING TO MACHINES DISPLAYED ON PARLOR LAYOUT (MACHINE SELECTION SCREEN), THAT IS, ALL PLAYERS ON SINGLE SCREEN

Chat (INPUT FRAME)

INPUT FRAME IS USED IN CHARACTER INPUT AND SENDING OF AREA Chat AND ISLAND Chat

"CHANGEOVER BUTTONS": FOR SELECTING Chat
"ISLAND BUTTON" FOR ISLAND Chat
"AREA BUTTON" FOR AREA Chat

- "SENDING BUTTON" FOR SENDING MESSAGE

MACHINE INFORMATION DISPLAY

MACHINE INFORMATION DISPLAY SHOWS PLAYERS HOW THINGS ARE IN THE ENTIRE HALL
(PLAY SCREEN APPEARS BY CLICKING HERE)

MACHINE INFORMATION DISPLAY

DISPLAY CONTENTS:
- MACHINE NUMBER DISPLAY
- BIG-HIT DISPLAY
- POSSESSED MEDAL-NUMBER DISPLAY

MACHINE INFORMATION DISPLAY (MACHINE NUMBER DISPLAY)

MACHINE NUMBER DISPLAY SHOWS MACHINE NUMBER IN PARLOR

DISPLAY METHOD:
- NUMERAL DISPLAY
- NUMBERS OF ONE TO THREE FIGURES
- SERIAL NUMBERS ASSIGNED TO ALL MACHINES WITHIN PARLOR

FIG. 31
MACHINE INFORMATION DISPLAY (BIG-HIT DISPLAY)
"BIG-HIT DISPLAY" SHOWS WHICH MACHINE IS IN BIG HIT WITHIN HALL
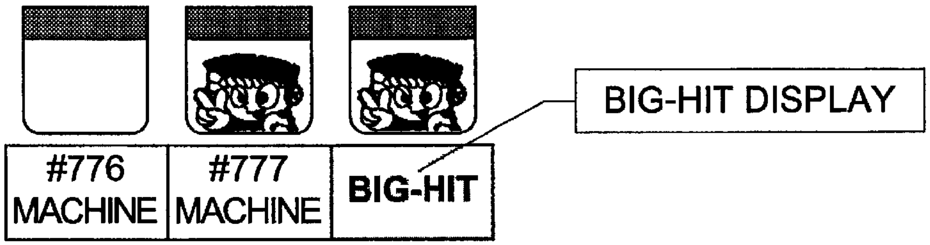
DISPLAY METHOD:
- DISPLAY CHARACTER: "BIG-HIT"
- CORRESPONDING BONUS POINT: "BIG-HIT" AND "REGULAR-HIT"
- DISPLAY TIME: DURING BIG HIT
- INDICATION: "BIG-HIT" AND "MACHINE NUMBER" GO ON AND OFF
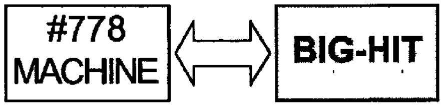
TWO INDICATIONS ARE DISPLAYED ALTERNATELY

FIG. 32

MACHINE INFORMATION DISPLAY (BIG-HIT NUMBER DISPLAY)

POSSESSED COIN NUMBER DISPLAY IS USED TO DISPLAY NUMBER OF BIG HITS OBTAINED BY PLAYER

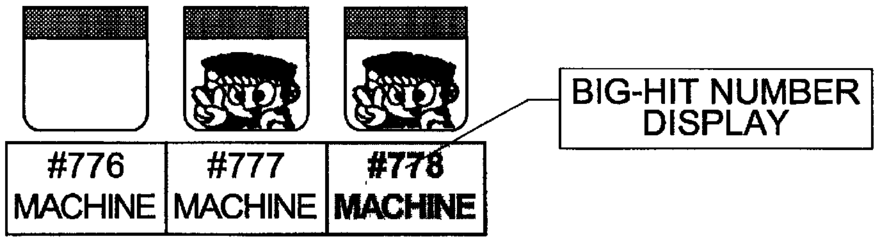

DISPLAY METHOD:

- BACKGROUND COLOR OF MACHINE NUMBER CHANGES
- BACKGROUND COLOR CORRESPONDS TO COIN NUMBER AS FOLLOWS:

| BIG-HIT NUMBER (LIMITED TO "BIG-HIT") | BACKGROUND COLOR | IMAGE |
|---|---|---|
| 0 - 10 TIMES | WHITE | #778 MACHINE |
| 10 - 20 TIMES | YELLOW | #778 MACHINE |
| OVER 20 TIMES | RED | #778 MACHINE |

FIG. 33
USER DISPLAY
"USER DISPLAY" SHOWS USERS SITTING TO MACHINE AND PLAYING IN PARLOR
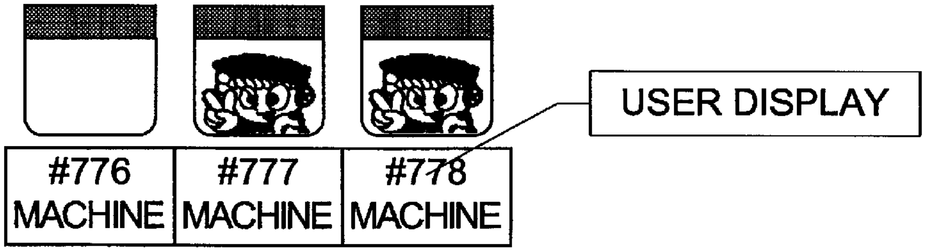
DISPLAY METHOD:
- USER IMAGE SELECTED AT TIME OF USER ENTRY
- DISPLAY OF MACHINE WITH USER IMAGE SHOWS THAT THE USER IS PLAYING HERE
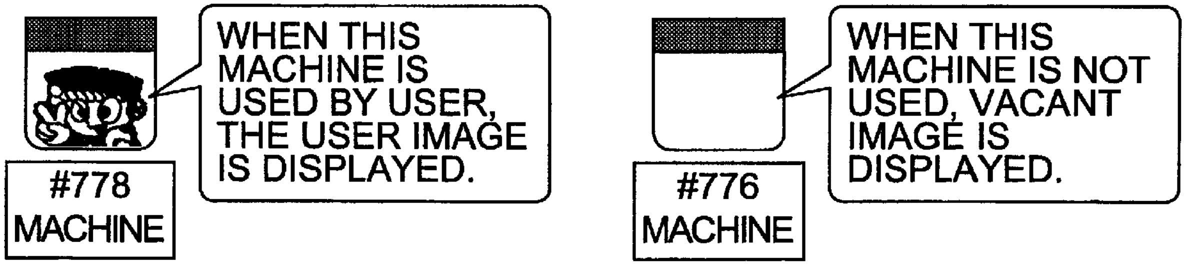

DATA DISPLAY

DISPLAY CONTENTS:

- "No." INDICATES NUMBER OF MACHINE DESIGNATED BY ARROW
- "START" INDICATES NUMBER OF STARTS (ROTATIONS) BETWEEN ONE BIG-HIT AND ANOTHER BIG-HIT
- "BIG" INDICATES NUMBER OF BIG HITS OBTAINED THAT DAY
- "REG" INDICATES NUMBER OF REGULAR HITS OBTAINED THAT DAY

UPDATE FREQUENCY: APPROXIMATELY REAL TIME

DATA DISPLAY

DETAILS OF DATA:
FIELDS OF "START", "BIG", AND "REG" INDICATE TOTAL NUMBERS AT THAT TIME
(THESE DATA ARE RETAINED EVEN IN CASE OF PLAYER CHANGE)

PLAY SCREEN

PLAY SCREEN IS USED IN ACTUAL *Pachislo* PLAY

FIG. 38

PLAY SCREEN

DISPLAY CONTENTS:

- "COIN CONTAINER / COIN DISPLAY" TO ROUGHLY SHOW POSSESS MEDAL-NUMBER IN IMAGE OF COIN OR COIN CONTAINER
- "MACHINE NUMBER DISPLAY" TO SHOW SELECTED MACHINE NUMBER
- "MACHINE TYPE DISPLAY" TO SHOW SELECTED MACHINE-TYPE (MACHINE NAME)
- "MACHINE INFORMATION DISPLAY" TO SHOW VARIOUS DATA OF SELECTED MACHINE (THE NUMBER OF START, BIG HITS, etc.)
- "EXPLANATION BUTTON" TO SHOW INFORMATION OF SELECTED MACHINE (HOW TO PLAY, ATTACK METHOD, etc.)
- "PERSONAL DATA" TO SHOW INDIVIDUAL (TOTAL) BALANCE IN ENTIRE PARLOR ON SITE
- "CLEAR BUTTON" FOR STOPPING *Pachislo* PLAY

FIG. 39

PLAY SCREEN

DISPLAY CONTENTS:

- "*Pachislo* SCREEN" TO SHOW MACHINE WITH WHICH USER PLAYS
- "PAYOUT MEDAL-NUMBER DISPLAY" TO SHOW MEDAL-NUMBER PAID OUT DURING *Pachislo* PLAY
  (SAME IS DISPLAYED ON SCREEN OF *Pachislo* MACHINE)
- "CREDIT MEDAL-NUMBER DISPLAY" TO SHOW MEDAL-NUMBER CREDITED ON *Pachislo* MACHINE (SAME IS DISPLAYED ON SCREEN OF *Pachislo* MACHINE)
- "POSSESSED MEDAL-NUMBER DISPLAY" TO SHOW BALANCE OF MEDAL-NUMBER THAT PLAYER OBTAINED WITH THE MACHINE, NAMELY NUMBER OF MEDALS POSSESSED BY THE PLAYER
  (THIS EXACTLY SHOWS MEDAL-NUMBER THAN "COIN CONTAINER / COIN DISPLAY" )

COIN CONTAINER / COIN DISPLAY

COIN CONTAINER / COIN DISPLAY ROUGHLY SHOWS MEDAL-NUMBER THAT PLAYER OBTAINED (AND CURRENTLY POSSESSES)

DISPLAY METHOD:
- INDICATED BY COIN OR COIN CONTAINER
- NUMBER CORRESPONDS TO IMAGE AS FOLLOWS:

| POSSESSED COIN-NUMBER | INDICATION | IMAGE |
|---|---|---|
| 20 PIECES | ONE COIN | |
| 200 PIECES | A LUMP OF COIN | |
| 2000 PIECES | ONE COIN CONTAINER | |

MACHINE NUMBER DISPLAY

CURRENTLY SELECTED (IN PLAY) MACHINE NUMBER IS DISPLAYED

MACHINE TYPE (MACHINE NAME) DISPLAY

CURRENTLY SELECTED (IN PLAY) MACHINE TYPE (MACHINE NAME) IS DISPLAYED

DISPLAY METHOD:
SIMILAR TO "MACHINE TYPE SELECTION ICON" OF MACHINE SELECTION SCREEN (PARLOR LAYOUT SCREEN)

FIG. 43

MACHINE INFORMATION DISPLAY

VARIOUS DATA OF MACHINE (THE NUMBER OF START, BIG-HIT, etc.) ARE DISPLAYED

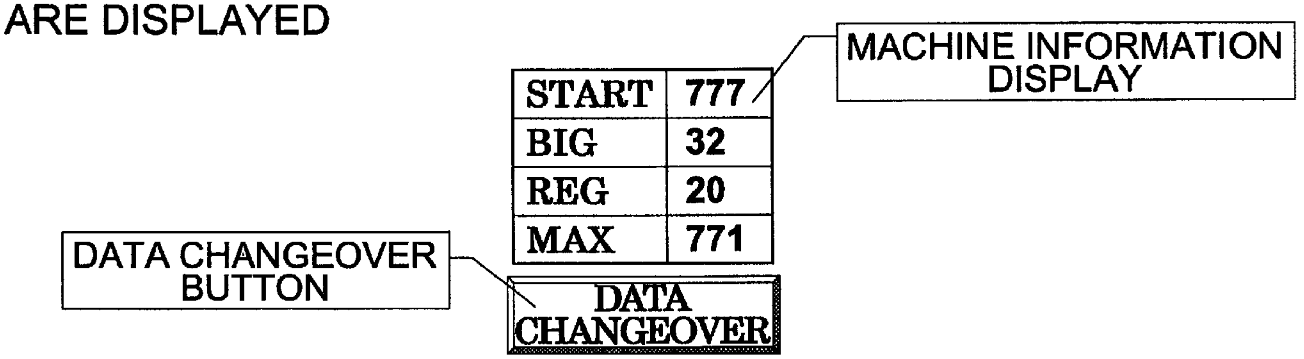

DISPLAY CONTENTS:

- "START" INDICATES NUMBER OF STARTS (ROTATIONS) BETWEEN O NE BIG-HIT AND ANOTHER BIG-HIT
- "BIG" INDICATES NUMBER OF BIG HITS OBTAINED THAT DAY
- "REG" INDICATES NUMBER OF REGULAR HITS OBTAINED THAT DAY
- "MAX" INDICATES MAX-OBTAIN NUMBER BY ONE BIG-HIT ON THAT DAY
- "DATA CHANGEOVER BUTTON" FOR CHANGING DISPLAY TOTAL DAT A AS FOLLOWS:
  - 1-PUSH···DATA OF "START", "BIG", "REG", AND "MAX" OF THE DAY BEFORE
  - 2-PUSH···DATA OF "START", "BIG", "REG", AND "MAX" OF TWO DAYS BEFORE
  - 3-PUSH···RETURN TO INITIAL DISPLAY DATA

FIG. 44

MACHINE INFORMATION DISPLAY

DETAILS OF DATA:
( * SIMILAR TO "DATA DISPLAY")
FIELDS OF "START", "BIG", "REG",AND "MAX" INDICATE
TOTAL NUMBER AT THAT TIME
(THESE DATA ARE RETAINED EVEN IN CASE OF PLAYER CHANGE)

FIG. 45

EXPLANATION BUTTON

TO VIEW EXPLANATION OF MACHINE (BASIC PLAY METHOD, ATTACK METHOD, etc.)

EXPLANATION BUTTON

| | |
|---|---|
| HOW TO PLAY | BONUS POINTS (PRIZE) CONFIGURATION |
| ATTACK METHOD | READY TO PRIZE (SPECIAL) PATTERN |

DISPLAY CONTENTS:

- "HOW TO PLAY" TO SHOW BASIC PLAY METHOD OF THE MACHINE
- "BONUS POINTS (PRIZE) CONFIGURATION" TO SHOW BONUS POINTS CONFIGURATION AND REEL LAYOUT OF THE MACHINE
- "READY TO PRIZE (SPECIAL) PATTERN" TO SHOW TYPICAL PATTERN OF THE MACHINE
- "ATTACK METHOD" TO SHOW BASIC ATTACK METHO D OF THE MACHINE

DISPLAY CONTENTS:

*Pachislo* EXPLANATION WINDOW WILL BE OPENED

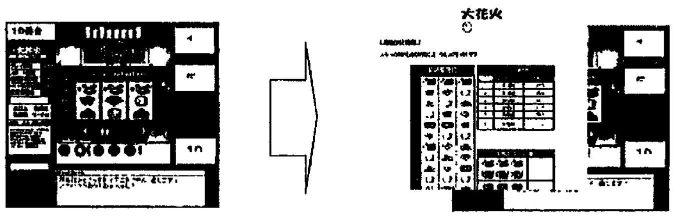

FIG. 46

PERSONAL DATA

PERSONAL TOTAL BALANCE IN ENTIRE PARLOR ON SITE IS DISPLAYED

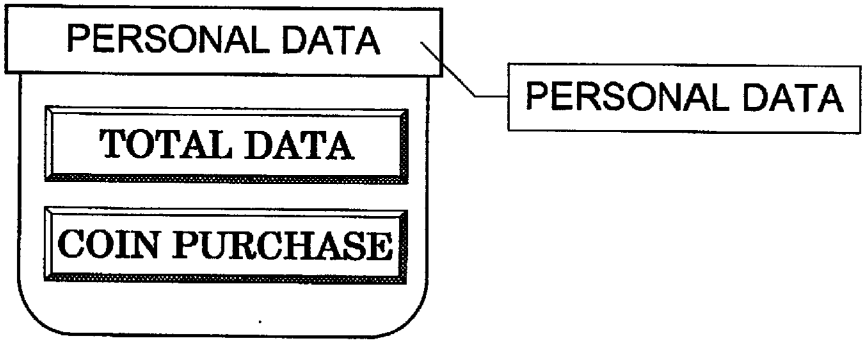

DISPLAY CONTENTS:

- "SITE TOTAL BALANCE" TO SHOW HOW MUCH PLAYER EARNS BY *Pachislo* ON SITE
- "PRESENT RANKING" TO SHOW PLACE IN RANKING DECIDED BASED ON TOTAL BALANCE
- "PREVIOUS DATA" TO SHOW PLAYER'S PREVIOUS BALANCE
- "TOTAL DATA" TO SHOW PLAYER'S PAST VARIOUS DATA
- "COIN PURCHASE" BUTTON TO PURCHASE COINS FOR PLAYING *Pachislo* ON SITE

FIG. 47

PERSONAL DATA (SITE TOTAL BALANCE)

DATA DETAILS:

·TERM OF TOTAL BALANCE CALCULATION: ONE MONTH
① RESET ON FIRST DAY OF EVERY MONTH
② DATA OF HIGH-RANKING PLAYERS OF EVERY MONTH ARE STORED IN "RANKING ROOM"

·DATA STORAGE / UPDATE: WHEN PLAYER TERMINATES PLAY ONE *Pachislo* MACHINE, THAT IS, WHEN "CLEAR BUTTON" IS PUSHED.

·DATA CONTENTS:
① COINS OBTAINED BY *Pachislo* ARE REFRECTED TO TOTAL BALANCE BY CONVERTING THE COINS INTO MONEY WITH "CLEAR BUTTON". (IN PROPORTION OF 100YEN TO FIVE COINS)
② COIN PURCHASE (50 COINS PER PUSH) MEANS REDUCTION IN TOTAL BALANCE.
WHENEVER PLAYER PUSHES "COIN PURCHASE" BUTTON, 1000YEN IS REDUCED FROM TOTAL BALANCE

FIG. 48

PERSONAL DATA (PRESENT RANKING)

- DATA CONTENTS: POSITION IN RANKING BASED ON TOTAL BALANCE
- TERM OF TOTAL BALANCE CALCULATION: ONE MONTH
  - ① RESET ON FIRST DAY OF EVERY MONTH
  - ② DATA OF HIGH-RANKING PLAYERS OF EVERY MONTH ARE STORED IN "RANKING ROOM"
- DATA STORAGE / UPDATE: WHEN PLAYER TERMINATES PLAY WITH ONE *Pachislo* MACHINE, THAT IS, WHEN "CLEAR BUTTON" IS PUSHED.

FIG. 49

PERSONAL DATA (PREVIOUS DATA)

- DATA CONTENTS: PLAYER'S TOTAL BALANCE OF PREVIOUS *Pachislo* PLAY ON SITE (TOTAL BALANCE WHILE LOGIN AND LOGOUT AGAINST SITE)
- FREQUENCY: AT EACH PLAY
- DATA STORAGE / UPDATE: PLAYER'S LOGOUT FROM SITE

**PERSONAL DATA
(COIN PURCHASE BUTTON)**

FUNCTION: PLAYER CAN PURCHASE 50 COINS PER PUSH
(1000 YEN ARE REDUCED FROM TOTAL BALANCE)

CLEAR BUTTON

THIS BUTTON IS USED WHEN TERMINATING *Pachislo* PLAY.

FUNCTIONS:

①COVERSION OF POSSESSED COINS INTO MONEY

②TOTAL BALANCE DATA UPDATE / STORAGE

*Pachislo* SCREEN

THIS SCREEN IS USED WHEN PLAYING *Pachislo*.

DISPLAY CONTENTS ARE BASICALLY SAME AS IN ACTUAL MACHINE.

PAYOUT MEDAL-NUMBER DISPLAY

PAYOUT MEDAL-NUMBER DURING *Pachislo* PLAY IS DISPLAYED.
("*Pachislo* SCREEN" HAS SIMILAR DISPLAY)

DISPLAY METHOD:
IN FIGURES (FROM ZERO TO 15)

DISPLAY CONTENTS:
SIMILAR TO "PAYOUT MEDAL-NUMBER" ON *Pachislo* SCREEN

CREDIT MEDAL-NUMBER DISPLAY

CREDIT MEDAL-NUMBER TO *Pachislo* MACHINE IS DISPLAYED.
("*Pachislo* SCREEN" HAS SIMILAR DISPLAY)

DISPLAY METHOD:
IN FIGURES (FROM ZERO TO 50)

DISPLAY CONTENTS:
SIMILAR TO "CREDIT MEDAL-NUMBER" ON *Pachislo* SCREEN

POSSESSED MEDAL-NUMBER DISPLAY

USER'S POSSESSED MEDAL-NUMBER IS DISPLAYED.

- POSSESSED MEDAL-NUMBER IS DISPLAYED IN FIGURES (FROM ZERO TO 99999)
- "COIN / COIN CONTAINER" IMAGE IS LINKED TO DATA OF POSSESSED MEDAL-NUMBER.

EXAMPLE OF PARLOR LAYOUT

GAME METHOD USING NETWORK, SERVER EXECUTING THE GAME METHOD, AND STORAGE MEDIUM STORING PROGRAM EXECUTING THE GAME METHOD

FIELD OF THE INVENTION

The present invention relates to a game method for enabling battle games through network such as internet a server capable of executing the game method, and a storage medium storing a program capable of executing the game method.

BACKGROUND OF THE INVENTION

Recently, there have been proposed a variety of techniques of providing services with which players at remote locations can play board games, such as shogi (Japanese chess) and igo (Game of go), by using internet server or leased server of mobile phone, such as i-mode, and leased line.

As typical representative of the system providing the board game service, there are prior arts disclosed in Japanese Patent Laid-open Publication Nos. 56-3078 and 54-110033, and Publication of EP11420.

Although various net-battle games have been proposed as stated above, the games are not really widespread. The reason for this is as follows.

There is not always a competitor's entry in a server. It is therefore not uncommon that no competitor is present even if a player accesses to the server for game purposes. This problem will be immediately solved by the spread of net-battle games, which however generally involves such a greatest problem of structuring environment in which battle games are executed between game players of equally matched in their skill level.

That is, when playing a battle game, it is more amusing for game players to battle with competitors of equal skill level. It is however inconvenient for game players demanding a battle game with a strong competitor that a game player of similar skill level is evenly and forcedly assigned.

This inconvenience is not limited to low-skill game players, because even high-skill game players may sometimes desire to accept a battle game with a low-skill game player.

SUMMARY OF THE INVENTION

Accordingly, it is an object of the present invention to overcome the above-described technical problem.

The present invention according to a first aspect is premised on that a game player accesses to a server through a terminal and plays a game on the server, and has the following features: i) before starting the game on the server, the game player registers a face image information as personal information, ii) the face image information is changed according to the game result, and iii) the changed face image information is used as face information of the next game.

In addition to user's address, name, or pen name, which has conventionally been registered in advance as personal information, face information is registered and changed according to the game result. Therefore, this permits a quick visual recognition of the previous game result.

Further, by continuously changing face image as the number of games is increased, glancing the face image, it can visually and sensibly understand whether the competitor has high skill level or not, when the player plays the battle game.

The term "battle game" is used herein in a comprehensive sense, i.e., to broadly refer to games wherein a player operating a terminal device joins a battle game on server, such as pachinko game (pinball game), pachislo game (Japanese slot game), board games, and other shooting games, etc. Examples of board games are shogi (Japanese chess), chess, and igo (Game of go). The term "terminal" is used herein to refer to devices connected to network and accessible to servers, such as personal computers or mobile phone.

The present invention according to a second aspect is premised on that a plurality of game players access to a server through a terminal and the players join a battle game on the server, and has the following features: i) before joining the battle game on the server, the players are registered in the server their face image information as personal information, ii) their face image information are changed every time the server executes the battle game, according to the game result, and iii) when the players play (join) a battle game on the server, their respective face images stored in the server are sent to terminal of the battle game competitors.

Glancing the competitors' face image, it can roughly understand the skill level of the competitor before starting the game.

The present invention according to a third aspect sends, before starting the game, their respective terminal the face image information attached to a list information of players who are registered as competitor and capable of playing (joining) the game.

The face image is of help to roughly understand the skill level of competitor before starting the game. Therefore, the players can play the game by mutually selecting their competitors. As the result, the competitor's skill level can be understood at a glance of face image, without reference-operation of the competitor's battle history, etc.

The present invention according to a fourth aspect is characterized in that: i) when performing a battle game as a game, it is configured to accept battle game requests from a plurality of game players who are previously entered on a server and capable of joining the battle game, ii) the terminal of the accepted game player is notified that there is the battle game request, and the battle game acceptance from the terminal is received, and iii) on receipt of the acceptance, the battle game execution is permitted.

This makes possible to select the competitor. In other words, the choice range of competitors is wide.

Specifically, when playing a battle game, it is more amusing for game players to battle with competitors of equal skill level. It is however inconvenient for game players demanding a battle game with a strong competitor that a game player of the same skill level is evenly and forcedly assigned. This inconvenience is not limited to game players of relatively low skill level, because even game players of high skill level may sometimes desire to accept a battle game with a low-skill game player. Without making the server forcedly select the competitor (the server side has not pick of the choices), allowing game players to select the competitor can solve the above problem.

The present invention, advantage in operating the same and aims which are attained by implementing the present invention will be better appreciated from the following detailed description of illustrative embodiment thereof, and the accompanying drawings.

BRIEF DESCRIPTION OF THE DRAWINGS

FIG. 5 is a diagram showing, in simplified form, the concept of parlor part;

FIG. 7 is a conceptual diagram for explaining the whole system of site;

FIG. 9 is a conceptual diagram for explaining the whole system of site;

FIG. 10 is a conceptual diagram for explaining the service of "battle room";

FIG. 11 is a conceptual diagram for explaining the service of "famous machine room";

FIG. 15 is a conceptual diagram for explaining link with mobile phone;

FIG. 18 is a conceptual diagram for explaining the machine selection screen;

FIG. 19 is a conceptual diagram for explaining a machine selection icon;

FIG. 20 is a conceptual diagram for explaining a ranking display screen;

FIG. 21 is a conceptual diagram for explaining ranking;

FIGS. 22 to 28 are diagrams showing, in simplified form, the configuration of chat frame;

FIGS. 30 to 32 are conceptual diagrams for explaining the machine information display screen;

FIG. 33 is a conceptual diagram for explaining a user display screen;

FIGS. 37 to 39 are conceptual diagrams for explaining the play screen;

FIGS. 41 to 44 are conceptual diagrams for explaining a machine information display screen;

FIG. 45 is a conceptual diagram for explaining an explanation-button display screen;

FIGS. 46 to 50 are conceptual diagrams for explaining a personal data display screen;

DETAILED DESCRIPTION OF THE PREFERRED EMBODIMENT

One preferred embodiment of the present invention will be described below in detail, based on the accompanying drawings.

[Configuration of Information-Providing System]

Figure 1:
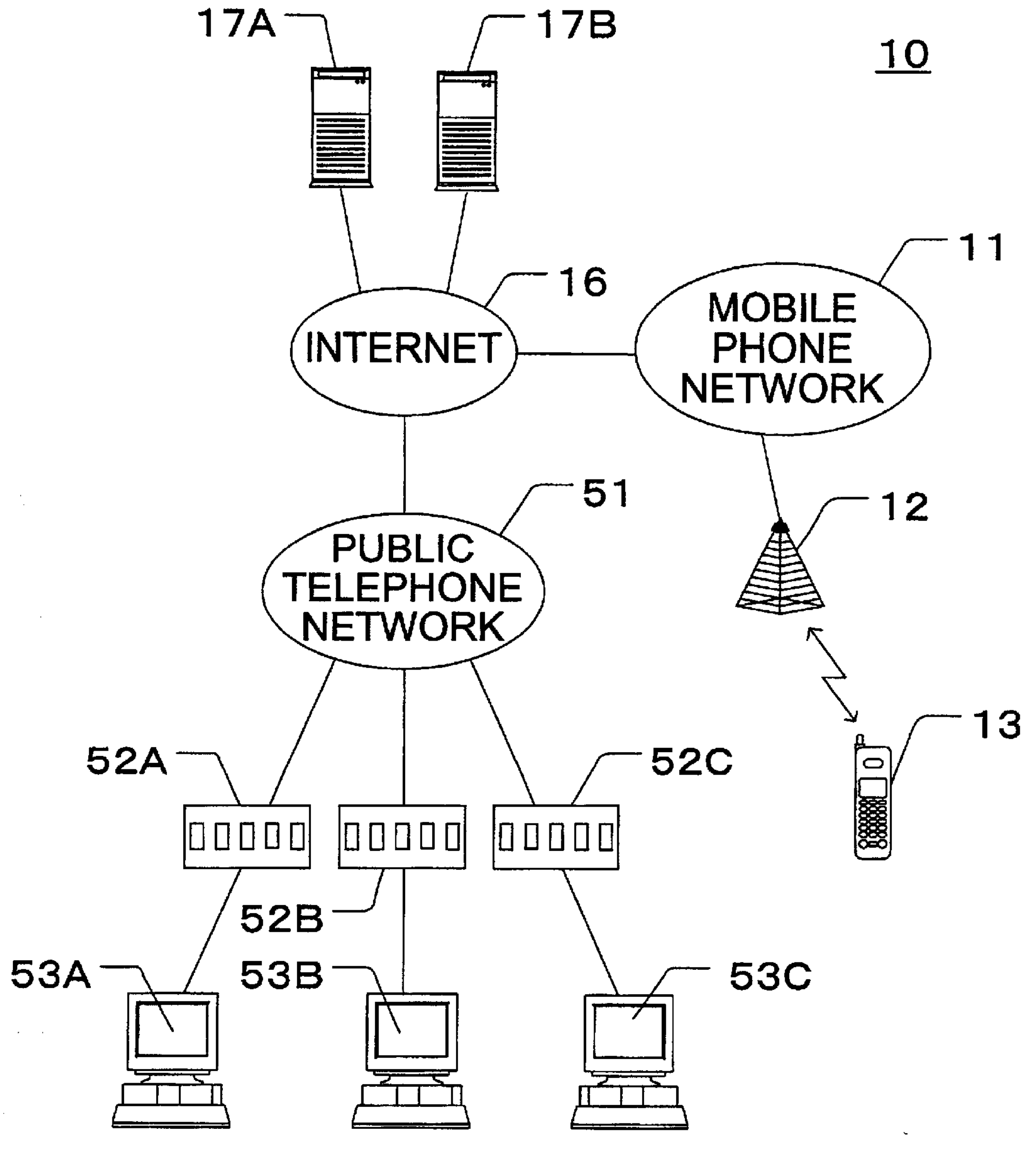
FIG. 1 is a diagram showing, in simplified form, the configuration of a network system according to one preferred embodiment of the present invention.

FIG. 1 is a diagram showing, in simplified form, the configuration of network system to which applied is an information-providing system providing net-games and other information according to one preferred embodiment of the invention. Referring to FIG. 1, a network system 10 includes a public telephone network 51, to which personal computers (hereinafter referred to as "PCs") 53A, 53B, 53C, . . . are accessible via modems 52A, 52B, 52C, . . . . The PCs 53A, 53B, 53C, . . . are accessible to information-providing servers (hereinafter referred to merely as "servers") 17A, 17B, . . . via the public telephone network 51 and internet 16 (i.e., host computers of providers connected to internet). Following is one example of access method. Thus, between the internet 16 (the provider's host computer) and the PC 53A, 53B, 53C, . . . sending/receiving of packets created by TCP/IP protocol group are performed by using dial-up PPP (Point-to-Point Protocol) connection. On the other hand, communication in TCP/IP protocol is performed on the internet 16 (between the provider's host computer and information-providing servers). Therefore, the PCs 53 can obtain various distribution information from the servers 17A, 17B, . . .

In addition to information receipt from the servers 17A, 17B, . . . , the PCs 53A, 53B, 53C, . . . can mutually send/receive voice data and character data (e.g., electric mail), via the servers 17A, 17B, . . .

Figure 2:
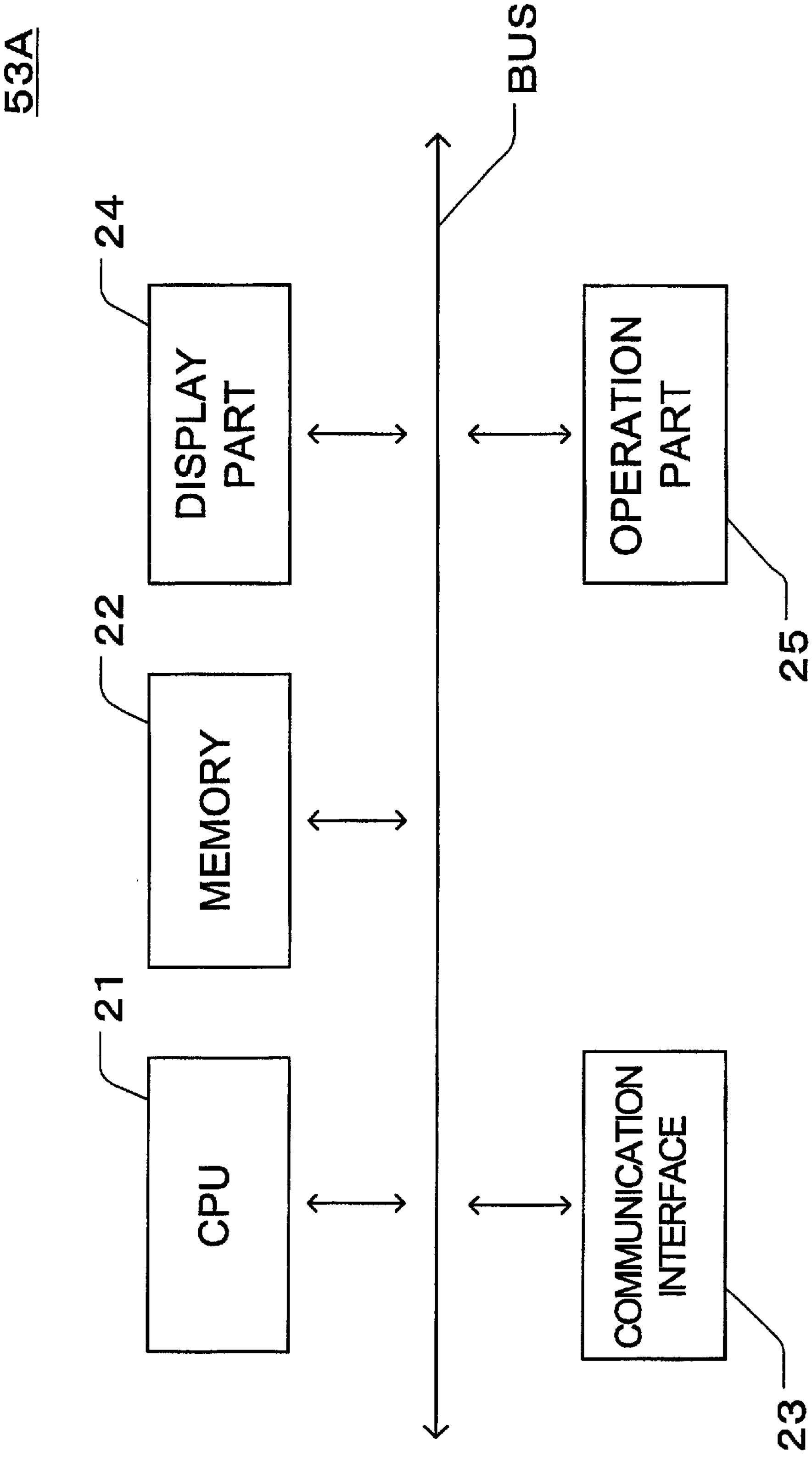
FIG. 2 is a block diagram showing the electrical configuration of a personal computer.

FIG. 2 is a block diagram showing the electrical configuration of personal computer. Although the following is description of PC 53A, other PCs 53B, 53C, . . . have the same configuration.

Referring to FIG. 2, the PC 53A includes a data bus BUS. To the data bus BUS, there is connected i) CPU 21, ii) memory 22, iii) communication interface 23 performing signal sending to/receiving from a modem 52A, iv) display part 24 configured with a liquid crystal display panel, CRT, etc., and v) operation part 25 comprising a keyboard, jog dial, etc.

The CPU 21 executes various operations according to operation programs stored in the memory 22, and controls the corresponding circuit part according to the operation. The various processing contents of the CPU 21 are displayed on the display part 24, as required.

When the user inputs address information of desired communication destination (URL (Uniform Resource Locator), etc.), the operation part 23 supplies data showing the address information to the CPU 21. The CPU 21 sends the provider of the internet 16 a request for connection to the communication destination showed by the address information that the user inputted. The provider forwards the information from the PC 53A to the servers 17A, 17B, . . . , which are the requested connection destination.

When the PC 53A demands (requests) certain information providing of the servers 17A, 17B, . . . , the provider of the internet 16 forwards the request to the servers 17A, 17B, . . . . Then, the servers 17A, 17B, . . . send the provider information that meets the request. At this time, the PC 53A sends to the servers 17A, 17B, . . . a terminal-specifying information together with a request signal. The terminal-specifying information is composed of i) password that is previously stored in the memory 22, ii) terminal-discriminating information (data that shows PC model), iii) information that specifies sending means, iv) telephone number of PC 53A, and v) various option data.

The provider forwards the information sent from the servers 17A, 17B, . . . to the PC 53A that is the request origin. Thus, the PC 53A can receive the desired information only by sending the provider the address of the servers 17A, 17B, . . . , and the request for information. As a result, the PC 53A displays the received information on the display part 24, thereby providing the information to the user of the PC 53A.

Figure 3:
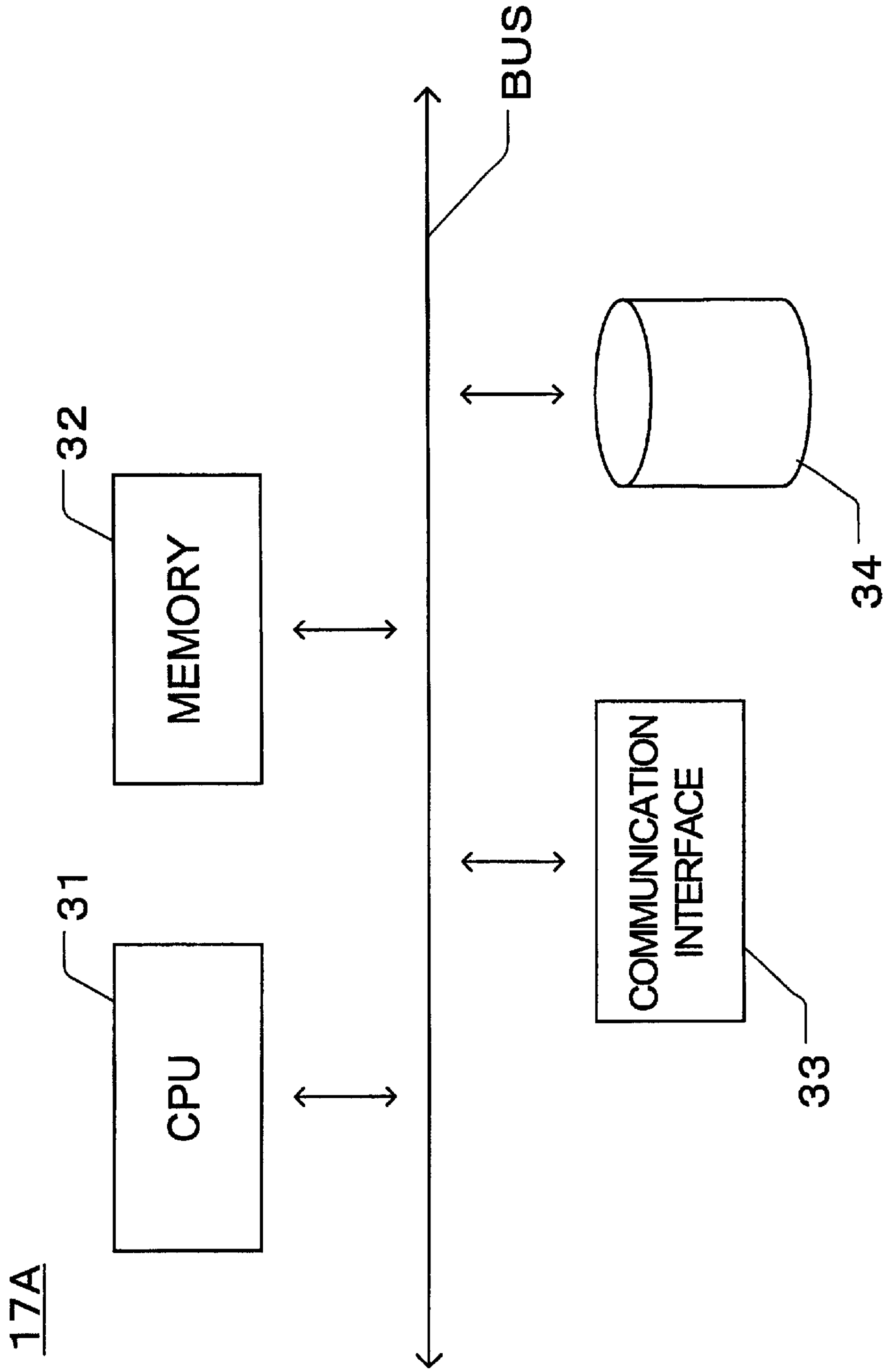
FIG. 3 is a block diagram showing the electrical configuration of an information-providing server.

FIG. 3 is a block diagram showing the electrical configuration of an information-providing server. Although the following is description of the server 17A, other servers 17B . . . have the same configuration.

Referring to FIG. 3, the server 17A includes a data bus BUS. To the data bus BUS, there is connected i) CPU 31, ii) memory 32, iii) communication interface 33, and iv) database 34.

The CPU 31 executes a variety of processing according to i) control programs stored in the memory 32, and ii) various contents and their programs stored in the database 34. Specifically, the CPU 31 receives, via a line connected to the communication interface 33, information from the PCs 53A, 53B, 53C, . . . , which are sent from the provider of the internet 16, and stores the information in the memory 32.

The information from the PCs 53A, 53B, 53C, . . . includes the request for information that the user inputted by operating the operation part 25 of the PCs 53A, 53B, 53C, . . . ; and the results of operation (operation information) that the user operated the operation part 25 on the PCs 53A, 53B, 53C, . . . , in accordance with the progress of a game program executed in the servers 17A, 17B, . . .

The CPU 31 executes the control program and game program, based on operation information according to the game program progress. The result of program progress is stored in the database 34.

[Information Provision by Information-Providing Server]

The server 17A provides, as information distributed to the PCs 53A, 53B, 53C, . . . various contents such as information about pachinko (pinball game) and pachislo (Japanese slot game), user-join-type pachinko/pachislo battle game service, etc. Control programs for providing these contents are stored in the memory 32 of the server 17A. When the CPU 31 executes this program, image data stored in the database 34 is read and distributed. In addition, the CPU 21 expands on the memory 32 a game program, such as of pachinko game, pachislo game, and their respective battle games, stored in the database 34, and executes the game program. As a result, the contents are provided to the PCs 53A, 53B, 53C, . . . . The program for providing contents, and game programs may be stored in other storage medium such as magnetic disk, instead of the database 34.

Figure 4:
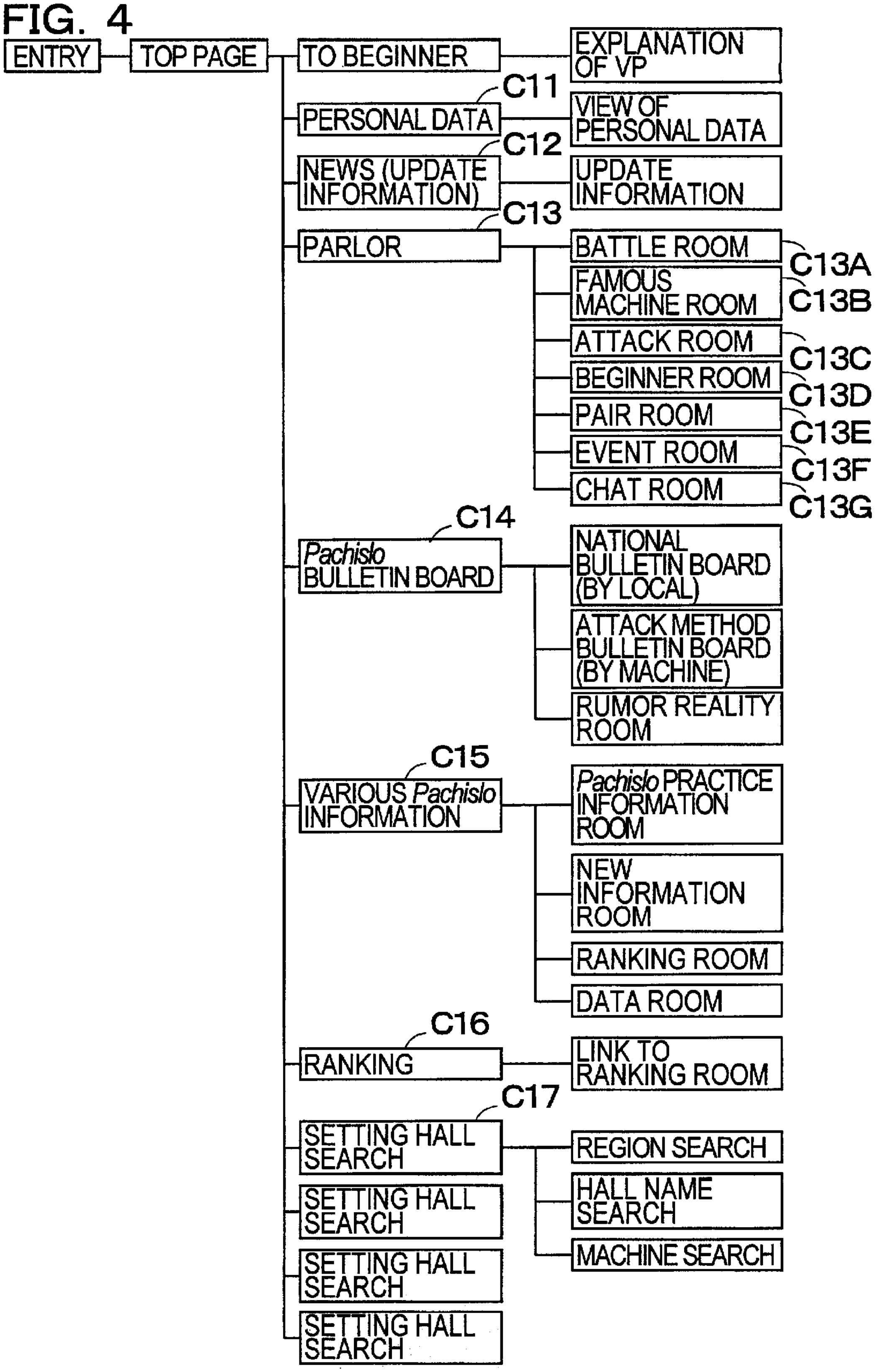
FIG. 4 is a diagram showing, in simplified form, the configuration of pachislo site.

Examples of pachinko/pachislo contents provided by the server 17A are, as shown in FIG. 4, i) “personal data” contents C11, ii) “NEWS” contents C12, iii) “parlor” contents C13, iv) “pachislo bulletin board” contents C14, v) “various pachislo information” contents C15, vi) “ranking” contents C16, and vii) “setting hall search” contents C17. Specifically, “personal data” contents C11 is used for viewing personal data. “NEWS” contents C12 provides a variety of new information. “Parlor ” contents C13 provides pachinko and pachislo game plays, and is also designed such that many people can join at the same time through communication with other players. “Pachislo bulletin board” C14 provides pachislo information by local or machine, by carrying on electronic bulletin board. “Various pachislo information” contents C15 provides pachislo-hall information and machine information. “Ranking” contents C16 provides pachislo game ranking. “Setting hall search” contents C17 provides information of halls setting pachinko machines and pachislo machines that are provided by the server 17A.

The service of providing “pachislo bulletin board” C14 includes the following services: i) “national bulletin board (by local)”, ii) “attack method bulletin board (by machine)”, and iii) “rumor reality room”. Specifically, “national bulletin board (by local)” is an electronic bulletin board for information exchange between pachinko or pachislo players in locals across the nation. “Attack method bulletin board (by machine)” is an electronic bulletin board for exchanging information such as the user’s personal attack method, etc. “Rumor reality room” provides a place at which rumors or doubtful attack methods are collected from players and resolved.

The service of providing “various pachislo information” contents C15 includes the following services: i) pachi-pro (professional pachislo player) practical information room”, ii) “new information room”, iii) “ranking room”, and iv) “data room.” Specifically, “pachi-pro practical information room” carries, in column style, pach-pro and amateur play data in actual halls. “New information room” carries new machine information and its setting hall information, hall event information across the nation, etc. “Ranking room” carries ranking of players within “parlor” contents C13 (i.e., within virtual parlor). “Data room” carries each parlor data within “parlor” contents C13 (i.e. within virtual parlor), and hall data across the nation.

[Parlor Contents]

Following is details of “parlor” contents C13. “Parlor” contents C13 is a site to provide information stored in the database 34 of the server 17A, pachinko and pachislo game programs, and other programs, to terminal devices such as PCs 53A, 53B, 53C, . . . Its concept is, as shown in FIG. 5, to provide pachinko and pachislo games to the users, as well as play elements related thereto and communication with others. Therefore, this site makes it possible to have communication with others through pachislo game.

Typical services of “parlor” contents C 13 are i) “battle room” service C13A, ii) “famous machine room” service C13B, iii) “attack room” service C13C, iv) beginner room”

service C13D, v) "pair room" service C13E, vi) "event room" service C13F, and vii) "chat room" service C13G. Specifically, "battle room" service C13A is designed to purely enjoy pachinko or pachislo game, and its battle with others. "Famous machine room" service C13B is designed to enjoy the past famous machines. "Attack room" service C13C is designed to practice pachinko or pachislo attack methods. "Beginner room" service C13D is designed for those who are not familiar with or desire to practice pachinko or pachislo. "Pair room" service C13E provides pair game play and a place at which players can met others. "Event room" service C13F opens various events and contests. "Chat room" service C13G is designed to enjoy chat while playing pachinko or pachislo game.

Figure 6:
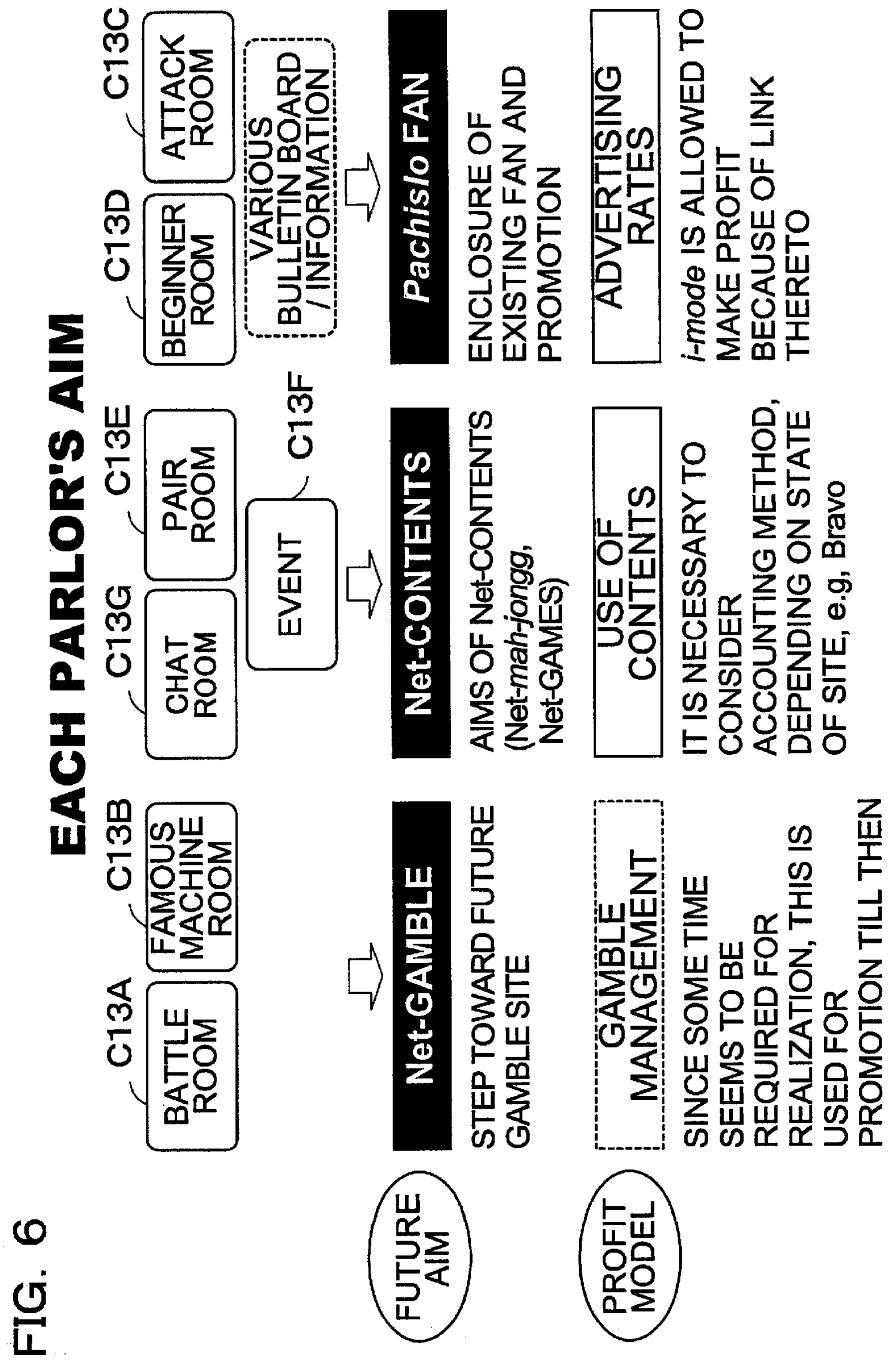
FIG. 6 is a conceptual diagram for explaining each parlor.

These services are, as shown in FIG. 6, classified into three systems ("Net-gamble" system, "Net-contents" system, and "pachislo-fan" system). Specifically, "Net-gamble" system is designed to enjoy pachinko and pachislo, and includes the following services: i) "battle room" service C13A, and ii) "famous machine room" service C13B. "Net-contents" system provides chat services and various events, and includes the following services: i) "chat room" service C13G, ii) "pair room" service C13E, and iii) "event room" service C13F. "Pachislo-fan" system provides various promotions or information for obtaining beginners and enclosing present fan, and includes the following services: i) "beginner room" service C13D, and ii) "attack room" service C13C.

FIG. 7 is a diagram showing, in simplified form, the whole system of contents provided by information-providing servers. Referring to FIG. 7, the basic principles of this contents is to provide pachinko and pachislo games to PCs 53A, 53B, 53C, . . . Every time players who are users of PCs 53A, 53B, 53C, . . . play these games, their play results are reflected to various services. For instance, the amount of coins that a player obtains by playing pachislo game in the game world is reflected to ranking in the game world. In addition to the foregoing, the player can also talk with other players by using chat service. Thus, through pachinko or pachislo game, the user can compete ranking with other players and add new mates.

Figure 8:
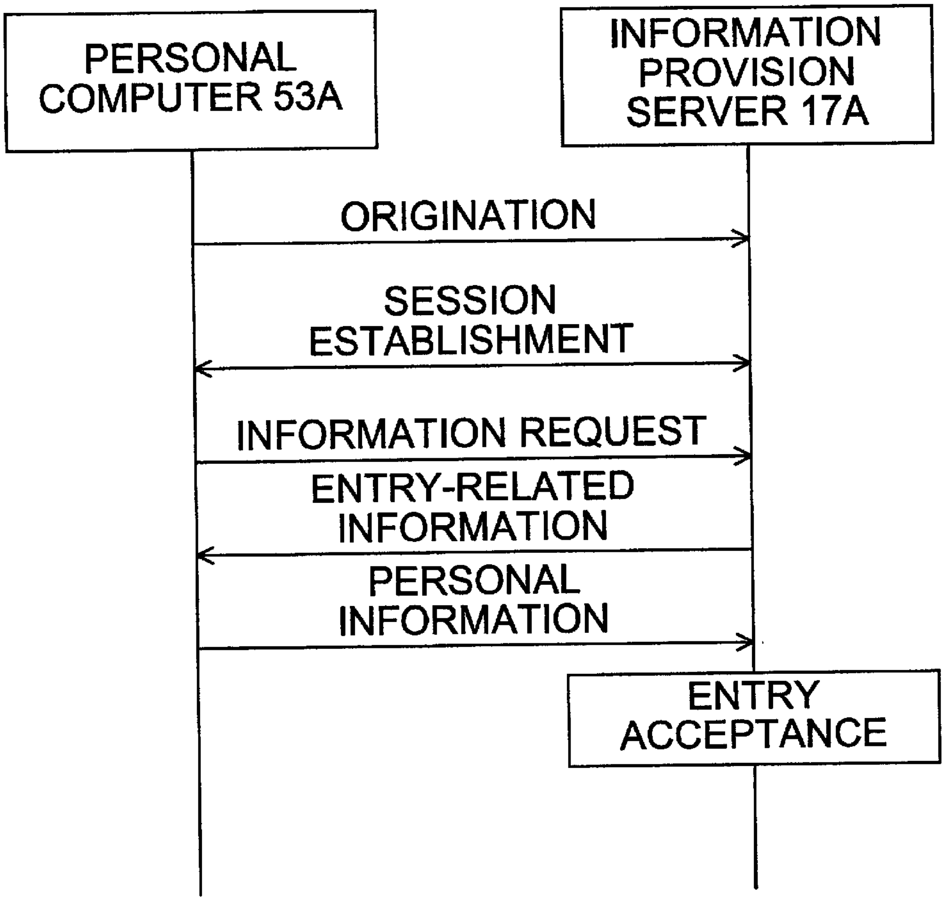
FIG. 8 is a timing chart showing the processing procedure of receiving player entry.

Description will next be given of registration that is performed when players join contents provided by the information-providing server 17A. For instance, when a player joint contents that the server 17A provides via PC 53A, the player accesses to the server 17A via the PC 53A, to make entry to the contents. That is, as shown in FIG. 8, in accordance with the player's input operation, the PC 53A calls the server 17A via the public telephone network 51 and internet 16, thereby securing a communication path.

The PC 53A establishes a session by information sending/receiving means with the PC 53A, such as PPP (Point To Point Protocol) processing, and then demands information for entry of the server 17A. At this time, the PC 53A sends the server 17A (specifically, via the provider on the internet 16) a terminal-specifying information and address information that specifies the requested information (information for entry). The terminal-specifying information is composed of i) password that is previously stored in the memory 22, ii) terminal-discriminating information (data that shows PC model), iii) information that specifies sending means, iv) telephone number of PC 53A, v) protocol information used for making connection, and vi) various option data.

On receipt of the request for information, the server 17A sends the PC 53A, the request sending origin, information for performing entry (image information and character information), which are stored in the database 34. On receipt of such information, the PC 53A displays a screen for performing entry on the display part 24, based on the received information. When the player inputs personal information (pen name, etc.) while watching the screen, the PC 53A sends the server 17A the inputted personal information. The server 17A stores this personal information in the database 34, so that the player's entry is accepted and its registration is executed.

At the acceptance of the entry, the server 17A also registers the player's face image together with the player's personal information in the database 34. For instance, as shown in FIG. 9, the server 17A changes the player's face image, which is registered in the database 34, according to the entry player's winning-percent in the game, and the player's skill level can be understood by this face image. In the initial step that the player makes entry, the face image is, for example, registered as face image of "old-man slotter" character CA11. Watching this face image, other players recognize that this player has just made entry. As this player repeats pachislo game, etc., its face image can be changed to a higher-skill-level character image one by one, according to the provided coin number, the results of battle with other player, or ranking. Finally, the face image is expressed in "pro-slotter" character CA12.

FIG. 10 is a conceptual diagram showing the outline of "battle room" service. Referring to FIG. 10, the "battle room" service C13A enables to play various pachislo machines in real parlor atmosphere. The server 17A sends PC 53A a virtual pachislo hall (parlor) data (i.e., image data and pachislo game program), and reproduces a parlor on the display part 24 of the PC 53A. In this parlor, a plurality of pachislo machines are arranged as in real parlor. The player operating the PC 53A can select one from the pachislo machines and enjoy pachislo play on the display part 24.

Data of provided coins and balance (the proportion of credit amount and provided coins) in pachislo play is immediately sent from the PC 53A to the server 17A, thereby updating the balance data of each player stored in the database 34. Based on the balance data, each player's ranking is determined by the server 17A.

Also, in "battle room" service C13A, any player can ask other player for assist such as "pushing the stop button (observation push (aiming)," through chat. In this instance, the player sends, through chat, a message stating that the player needs an assist, to other players who join in "battle room." That is, when the player operates to send a request for assist on the PC 53A, the PC 53A sends the request to the server 17A. On receipt of this request, the server 17A sends a message to ask for assist to other players in the corresponding parlor ("battle room"). PCs 53B, 53C, . . . , which are used by other players receiving this message, displays a message to ask for assist (e.g., "Please help me with "observation push (aiming).", on their respective display part 24. When a certain player sees this message and inputs a message stating that he/she can assist through his/her PC, this input result is sent to the server 17A. Upon this, the server 17A sends a message stating that the request for assist is accepted, to the PC 53A of the player waiting for assist. The server 17A removes the right to use of the pachislo machine of the player who receives assist to the player who performs assist, so that the latter player is capable of operating this pachislo machine. In this state, it is possible to perform assist such as "observation push," as well as talk with any player who joins in the parlor. Herein, "observation push" is operation of the stop button by the game player with the careful observation of the symbol marks.

FIG. 11 is a diagram showing, in simplified form, details of "famous machine room" service. Referring to FIG. 11, in "famous machine room" service C13B, the server 17A reads the past famous machine data stored in the database 34 (e.g., image data and play programs, information of halls at which famous machines are actually set), and sends this data to PC 53A. The PC 53A displays the famous machine data on the display part 24, so that the player can play a famous machine and obtain its various information on the screen displayed on the display part 24.

Figure 12:
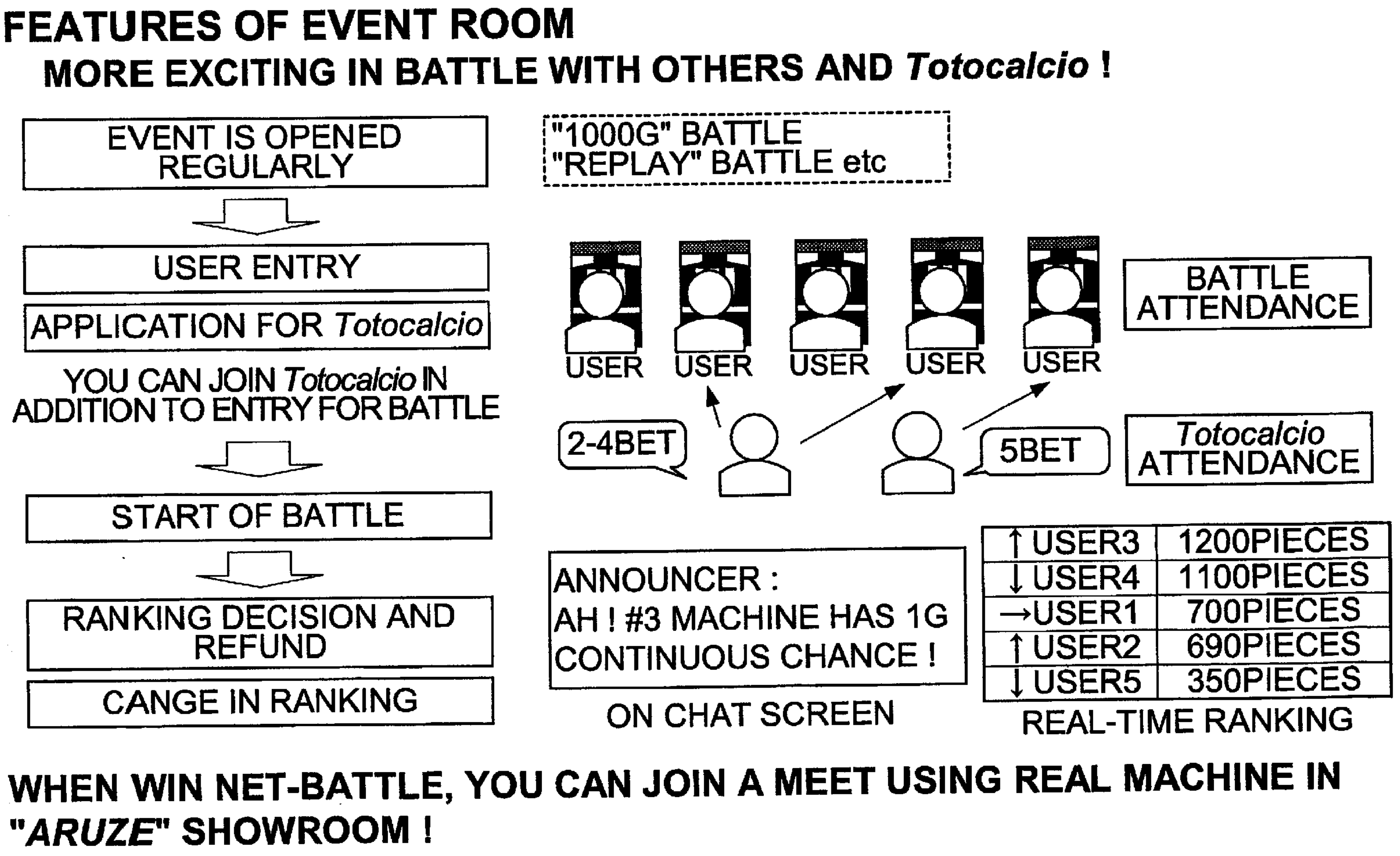
FIG. 12 is a conceptual diagram for explaining the service of "event room"

FIG. 12 is a diagram showing, in simplified form, details of "event room" service. Referring to FIG. 12, in "event room" service C13F, among a plurality of players, who join in "event room" service C13F, some players perform a battle game by using the famous machine, and other players join a quiz about the winner of this battle.

Figure 13:
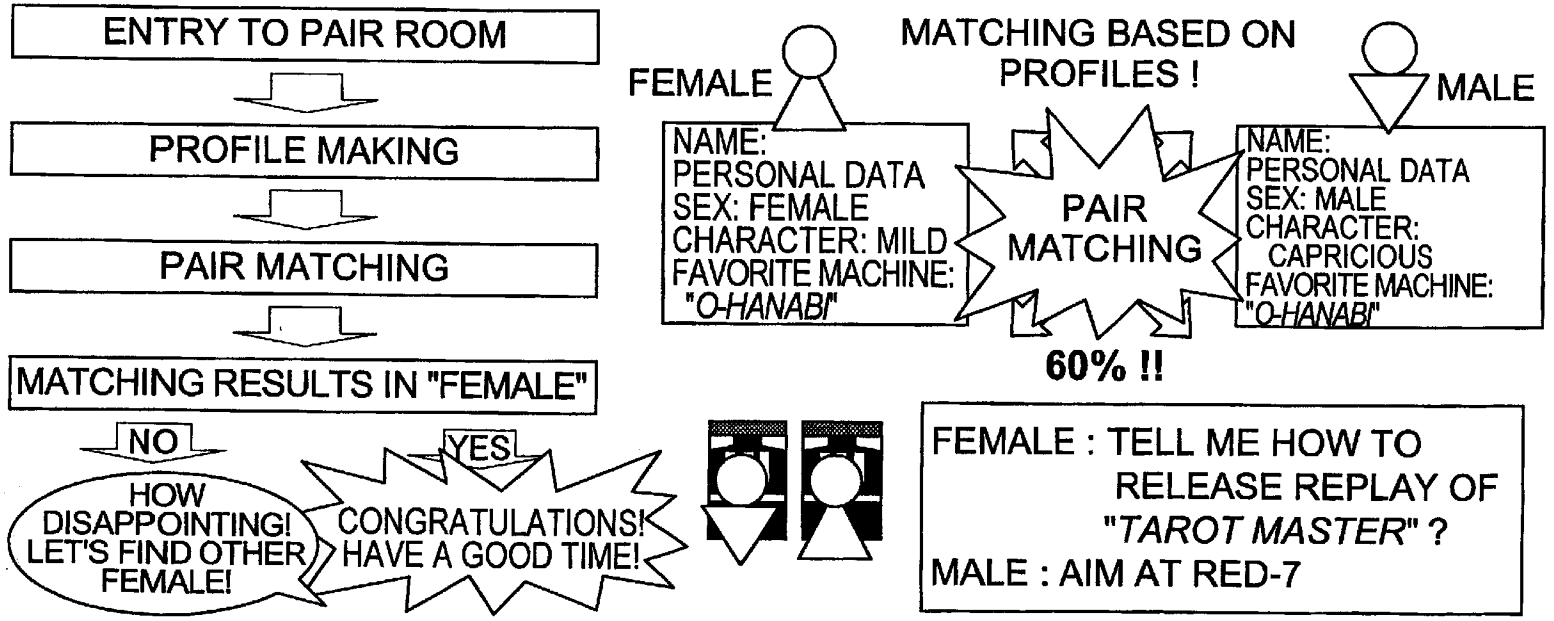
FIG. 13 is a conceptual diagram for explaining the service of "pair room"

FIG. 13 is a diagram showing, in simplified form, details of "pair room" service. Referring to FIG. 13, in the "pair room" service C13F, the player operates PC 53A to create his/her own profile and sends it to the server 17A. The server 17A makes a congenial pair by considering each player's profile, and sends paired players a screen for face-to-face conversation. Then, on this screen, each of the paired players inputs a conversational sentence. A conversational sentence inputted by one player is sent to the server 17A through PC that this player operates. The server 17A sends the other player the conversational sentence received from this PC, and the sentence is displayed on the screen of the other player's PC. Thus, the paired players made by (through) the server 17A can enjoy conversation in chat style. As the result, each player can enjoy pachislo game while having conversations on their respective screens (through the server 17A).

Figure 14:
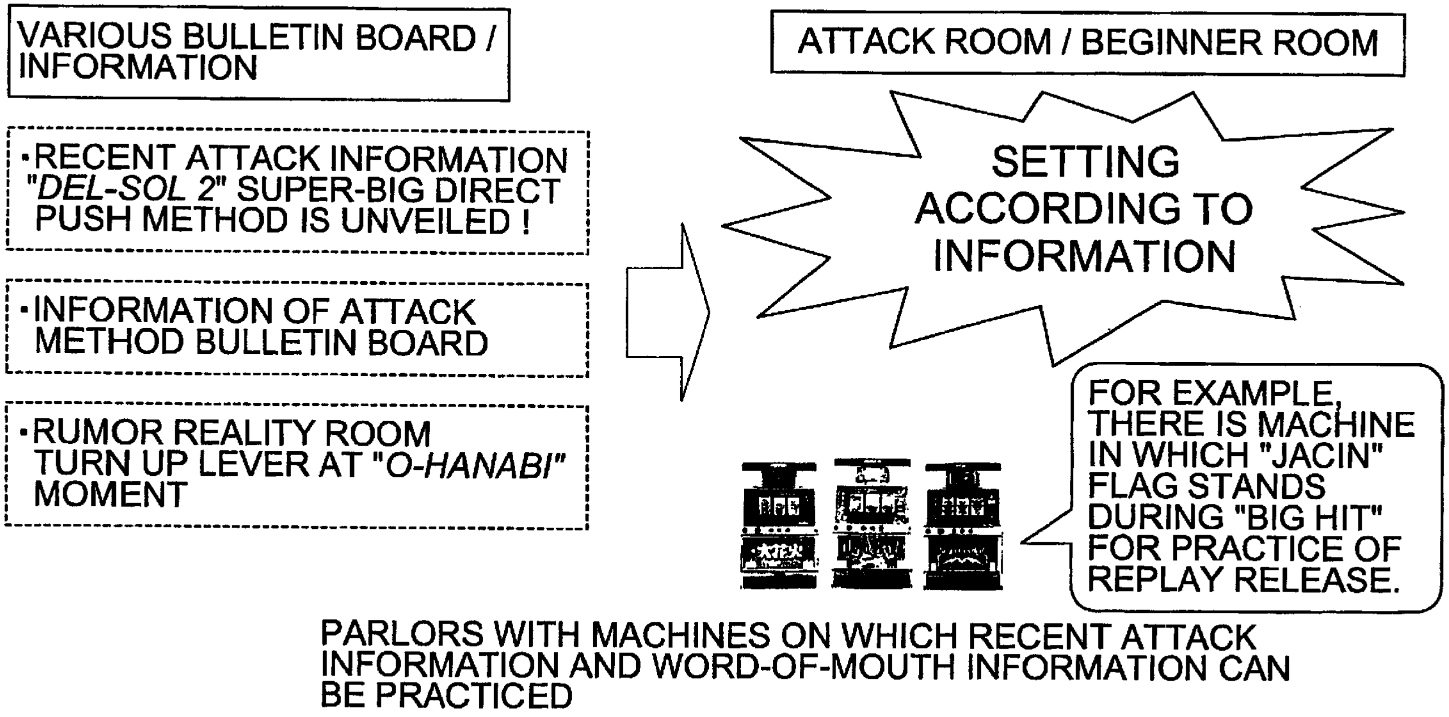
FIG. 14 is a conceptual diagram for explaining the services of "attack room/beginner room"

FIG. 14 is a diagram showing, in simplified form, details of "attack room" service and "beginner room" service. Referring to FIG. 14, in "attack room" service C13C and "beginner room" service C13D, explanations of the latest attack method and its play method of each machine type are sent from the server 17A to the PC 53A. The player can learn play methods and attack methods of pachislo game by referring to such information displayed on the display part 24 of the PC 53A.

More specifically, as shown in FIG. 15, the "attack room" service C13C is also designed to provide attack-information providing service, hall-information providing service, and personal balance service, via a mobile phone 13 (see FIG. 1). In this instance, when the player inputs, on the mobile phone 13, contents address (address designating a server that is the server 17A or another server to provide the contents), the mobile phone 13 accesses to the server 17A or another server via a base station 12 and public telephone network 11. The server 17A and another server has a contents file that is described in simplified HTML (compact HTML) form so as to be provided to mobile phones, in addition to contents files described in HTML form. On receipt of access to the file from the mobile phone 13, the server provides the mobile phone 13 with data described in simplified HTML form. Thus, simplified information corresponding to each contents shown in FIG. 4 is displayed on the display part of the mobile phone 13, in accordance with the player's operation for designation. As the result, the player can always enjoy contents that the server 17A provides.

[Battle Room]

Figure 16:
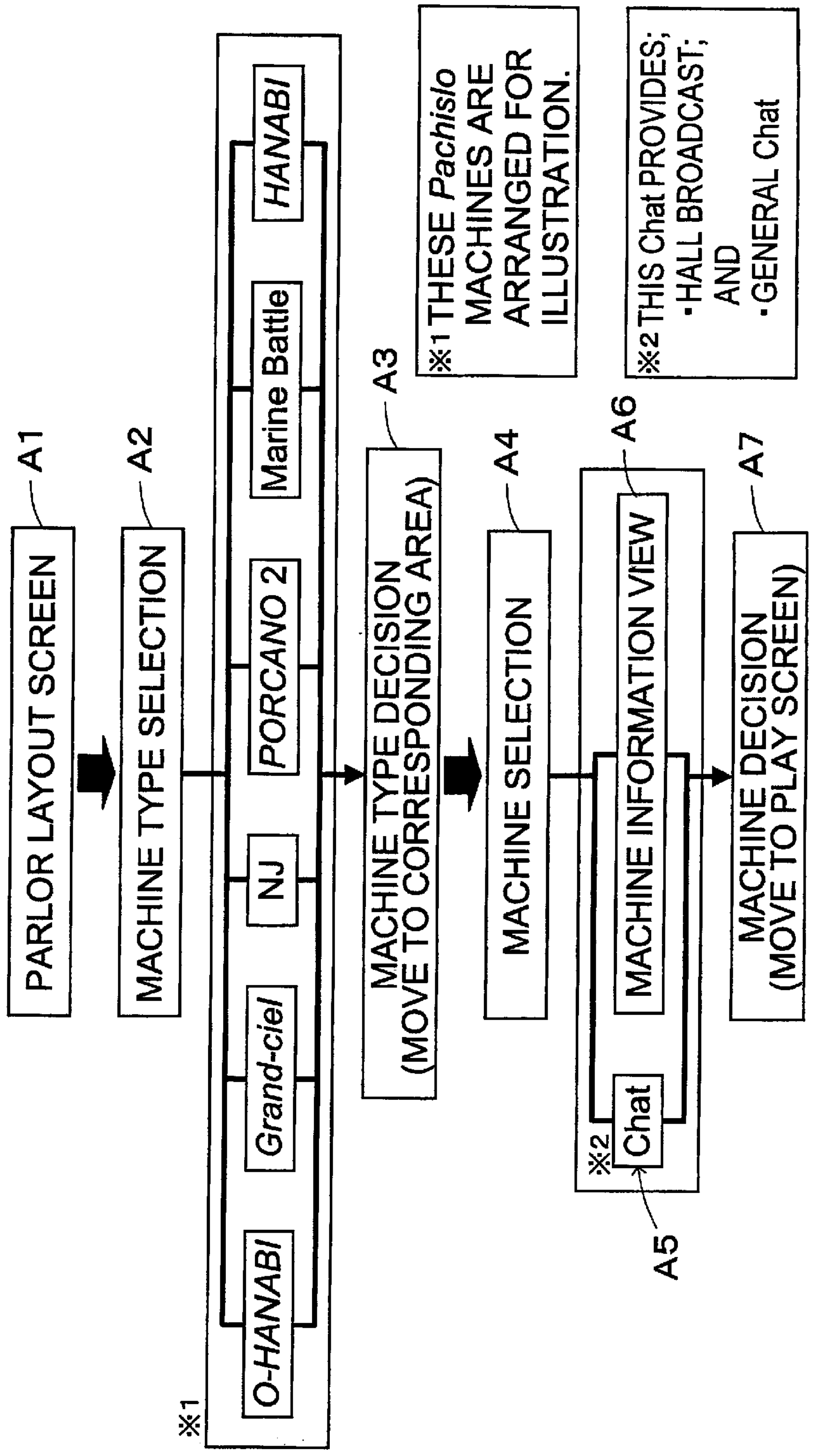
FIG. 16 is a conceptual diagram for explaining the outline of machine selection screen (parlor)

FIG. 16 is a flowchart showing the processing procedure of selecting a pachislo machine (Japanese slot machine) in contents of "battle room" service, which are sent from an information-providing server to a personal computer. Referring to FIG. 16, when a contents demand signal is sent from PC 53A, the server 17A accepts this demand and provides a parlor layout screen to the PC 53A, in step Al.

Figure 17:
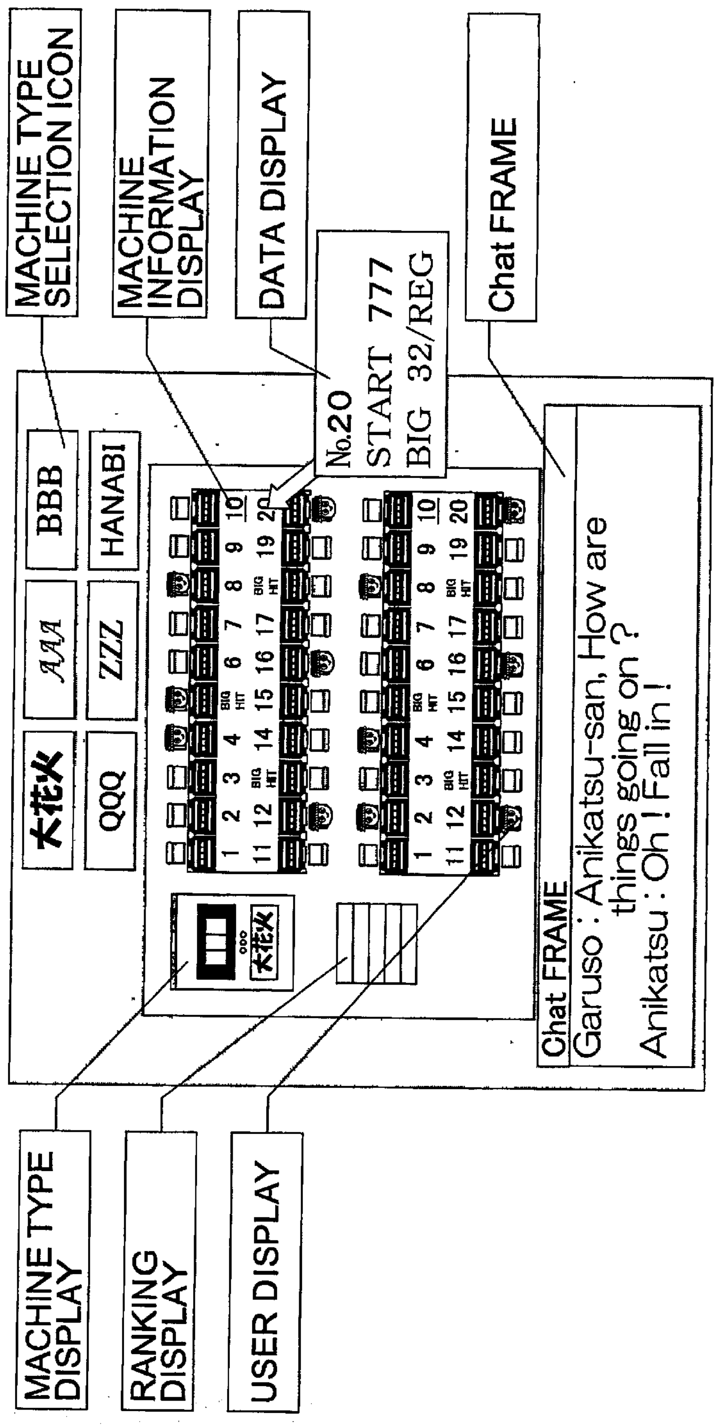
FIG. 17 is a diagram showing, in simplified form, the configuration of the machine selection screen (parlor layout)

The parlor layout screen (machine selection screen) is, as shown in FIG. 17, a screen on which a parlor layout is visually displayed by arrangement per pachislo machine area and character image expressing each pachislo machine player. This screen accompanies the followings: i) display of machine type of arranged pachislo machines, ii) display of ranking within the parlor, iii) display of users who are now playing, iv) display of machine information per arranged pachislo machine, v) display of data per arranged pachislo machine, and vi) display of chat frame that displays conversation with other player.

Referring to FIG. 18, "machine type display" displays the type of machine in currently displayed area (machine selection screen). "Ranking display" displays real-time ranking within the displayed area. "User display" displays whether a certain player is using the machine, in character that expresses the player. "Machine-type selection icon" is used for selecting the machine type in the area displayed on the machine selection screen. "Machine information display" displays machine conditions. By clicking this display, the player can proceed to the machine's play screen. "Chat frame" is used for hall information or communication between players.

FIG. 19 shows a machine-type selection icon on the machine type display previously described with reference to FIG. 17. Referring to FIG. 19, the machine-type selection icon is used for selecting the type of pachislo machine in the area displayed on the machine selection screen. When the player clicks the machine-type selection icon and selects the desired machine type, there is displayed the area where pachislo machines of the desired machine type are arranged.

FIG. 20 shows an example of ranking display on the machine selection screen previously described with reference to FIG. 17. Referring to FIG. 20, the ranking of player, who is now playing in the area displayed on the machine selection screen, is displayed in real time. As shown in FIG. 21, this ranking is decided based on the number of obtained coins, which is calculated by reducing the number of credit coins from the number of payout coins. In accordance with the player's play to the pachislo machine, the player's ranking, which is stored in the database 34 of the server 17A, is updated in real time.

Figure 22:
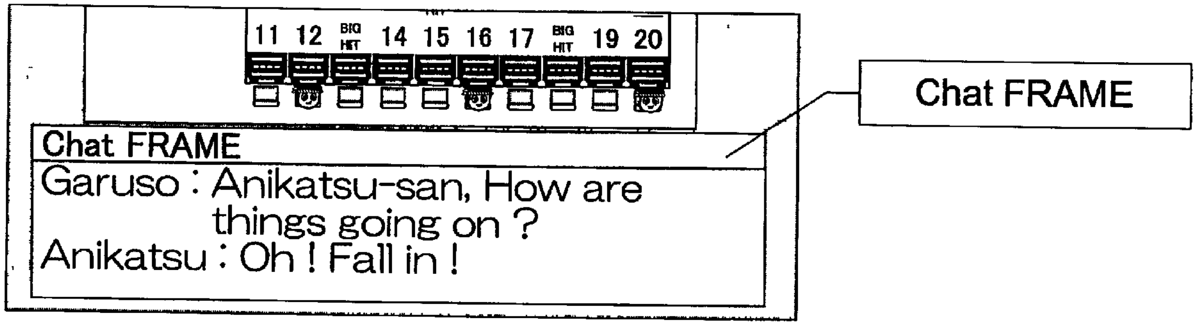

FIG. 22 is a diagram showing, in simplified form, details of the chat frame previously described with reference to FIG. 17. Referring to FIG. 22, the chat frame is used for display of hall broadcast, in addition to conversation between players.

Figure 23:
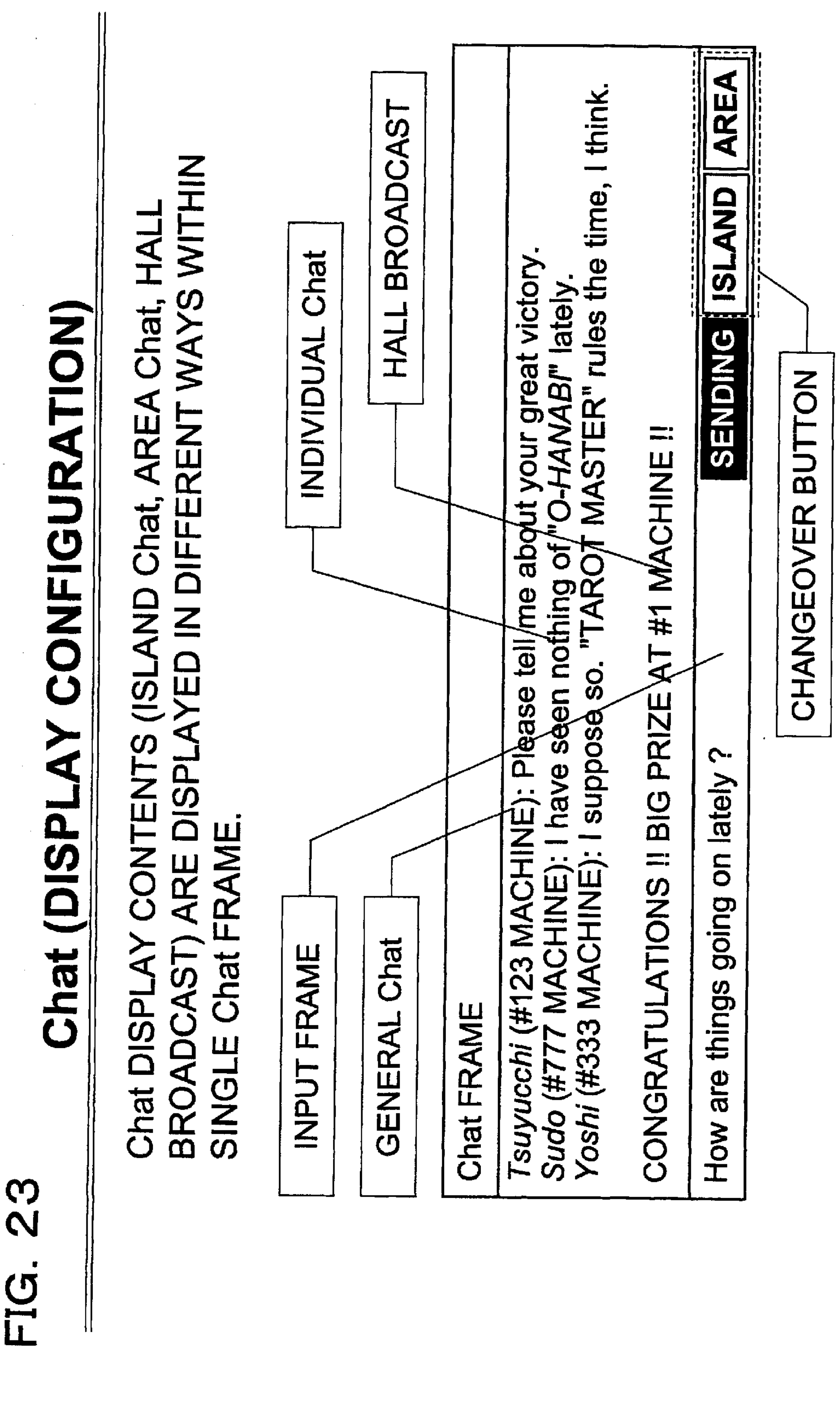
Figure 24:
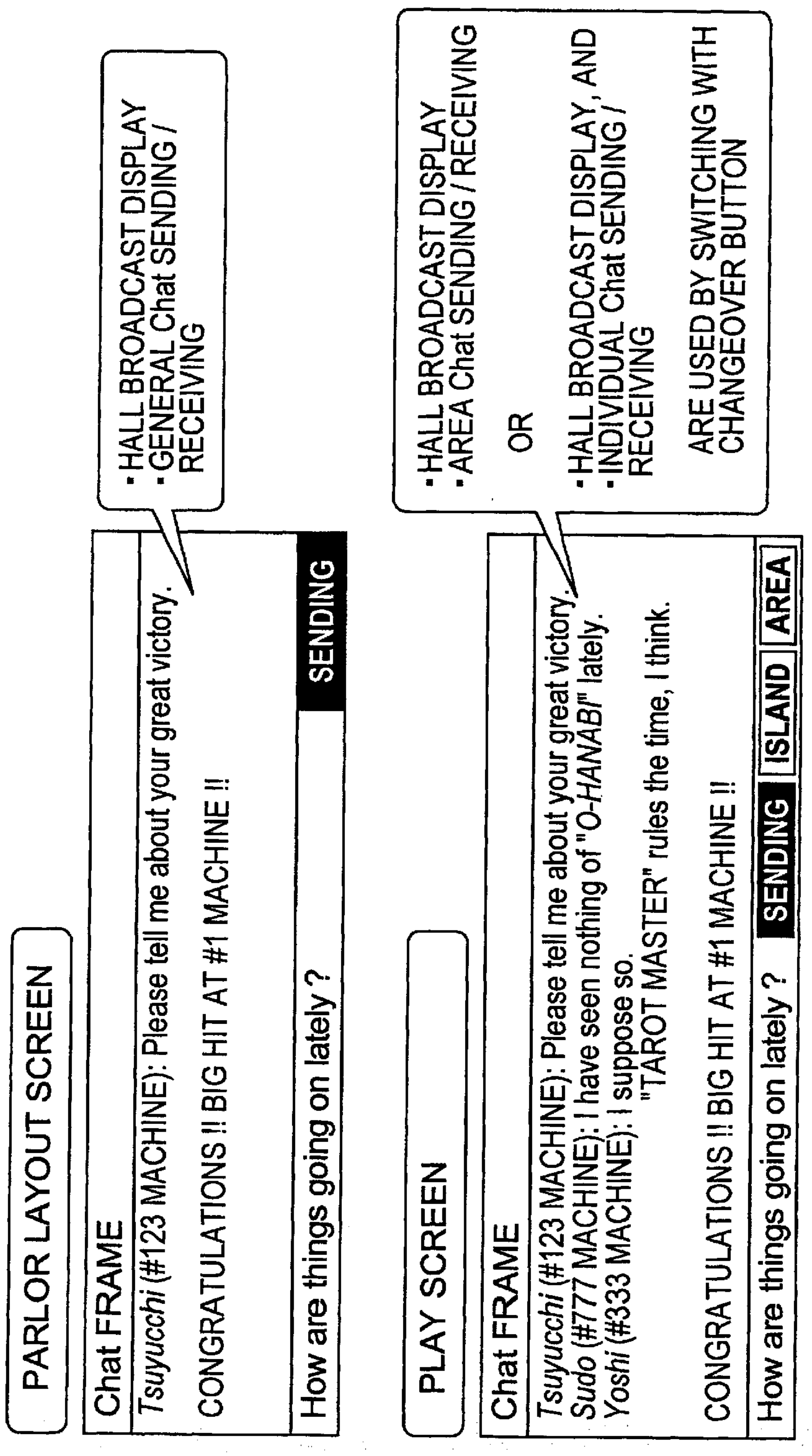

FIG. 23 shows an example of the chat frame display. Referring to FIG. 23, the chat frame display is divided into two parts: i) input frame part on which the player's input is displayed, and ii) general chat part on which the input result of other player is displayed. Specifically, in the general chat part, individual conversation of other player (individual chat) and hall broadcast are displayed in different display styles, such as different character sizes. As shown in FIG. 24, the chat frame is classified into two types: one which is displayed on the machine selection screen showing parlor layout (see FIG. 17); and the other which is displayed on play screen showing a pachislo screen on which a certain player is playing (see FIG. 37). Chat is classified, as shown in FIGS. 25 and 26, into two types: "area chat" that shows chat within parlor, as machine selection screen (see FIG. 17); and "island chat" that shows chat per island (an aggregate (unit) of pachislo machines wherein is circulating coins) in a certain area. The player can select chat type by selecting and operating changeover button (see FIG. 23) of the chat frame.

FIG. 27 shows an example of hall broadcast displayed on chat frame, saying that "Congratulations! A big-hit (big-prize or big bonus) at machine #1!!." Referring to FIG. 27, especially large characters are used in order to discriminate from conversations with other player.

Figure 28:
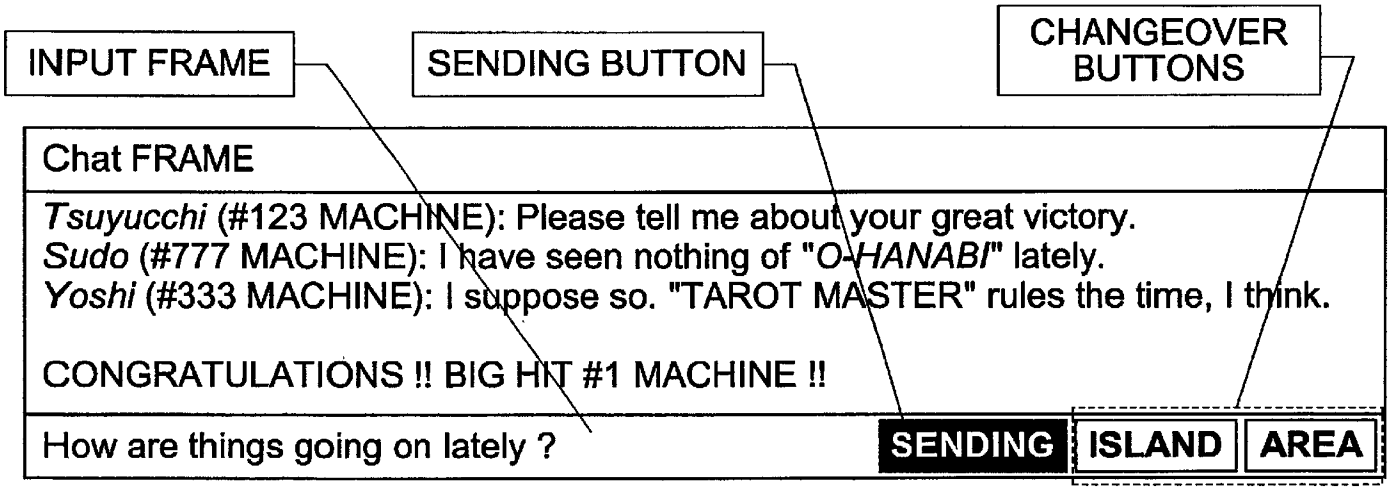

FIG. 28 shows an input frame in the chat frame. Referring to FIG. 28, when the player inputs a conversational sentence by operating the keyboard of PC 53A, its contents is displayed on the input frame. The player clicks the sending button of the input frame, thereby the PC 53A sends the server 17A the inputted message displayed on the input frame. The server 17A sends this message to the PC of another player who joins the area chat. Thus, the message sent from the PC 53A is displayed on the display screen of another player's PC. As the result, a conversation between the players is made on the chat frame.

Figure 29:
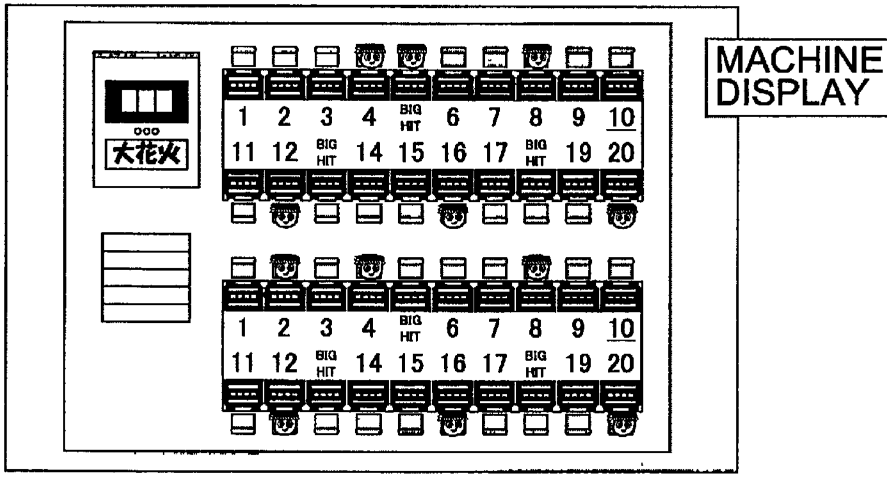
FIG. 29 is a diagram showing, in simplified form, the configuration of machine information display screen.

FIG. 29 is an example of area display on which there are arranged pachislo machines on the machine selection screen previously described with reference to FIG. 17. Referring to FIG. 29, this area display shows, as machine information, i) machine number of each machine, ii) big-hit display showing the occurrence of big hit; and iii) possessed coin-number of the player of machine currently in use. When the player selects the desired machine in this area, its play screen with the selected pachislo machine is displayed.

Figure 30:
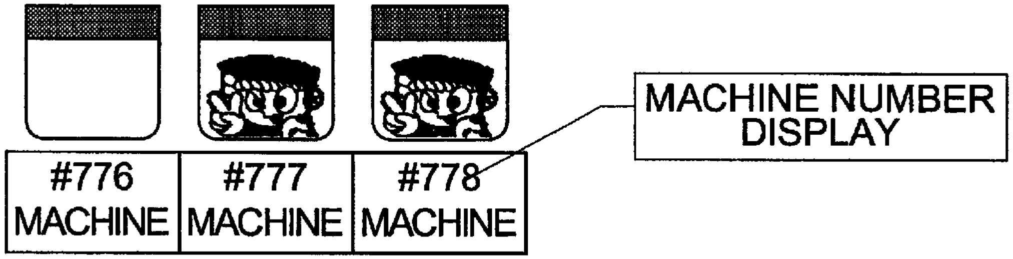

FIG. 30 shows details of the machine information previously described with reference to FIG. 29. Referring to FIG. 30, the machine number of each pachislo machine, which is assigned within the parlor, is displayed as machine information.

FIG. 31 shows a big-hit display in the machine information display. Referring to FIG. 31, with respect to the pachislo machine at which a big-hit occurs, characters saying "Big-hit" are displayed instead of its machine number.

FIG. 32 shows an example of display of big-hit frequency in the machine information display. Referring to FIG. 32, the color and brightness of the machine information display part of pachislo machine are changed according to the number of big hits occurred in the machine.

FIG. 33 shows a display example in the case that the player using the machine is displayed at the location corresponding to the machine information of each pachislo machine, in the area display part of the machine selection screen previously described with reference to FIG. 17. In this case, the player is displayed, for example, by using such a face image as previously described with reference to FIG. 9, according to the ranking of the player, etc. By doing so, the player's skill level (ranking, etc.) can be understood.

Figure 34:
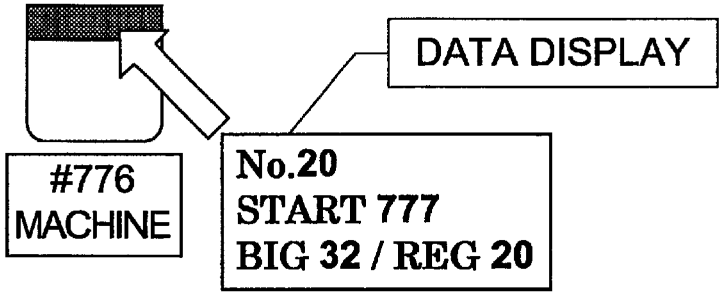
FIGS. 34 and 35 are conceptual diagrams for explaining a data display screen.
Figure 35:
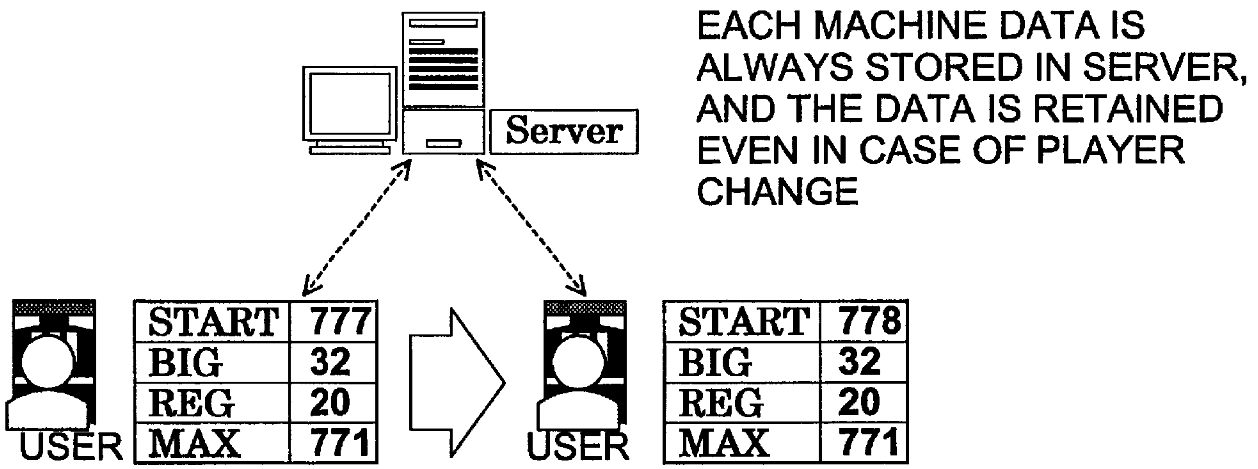

FIG. 34 shows an example of data display that is obtained by clicking each pachislo machine. Referring to FIG. 34, in this display style, there are displayed i) machine number, ii) the number of rotations between one "BIG HIT" and another "BIG HIT," iii) the number of "BIG HIT" obtained that day, and iv) the number of "REGULAR HIT (REGULAR PRIZE OR REGULAR BONUS)" obtained that day. As shown in FIG. 35, these data are retained in the database 34 of the server 17A, even when the player of the pachislo machine is changed.

Referring again to FIG. 16, when the player selects machine type on the parlor layout screen (step A2), a certain area where pachislo machines of the selected machine type are arranged, that is, machine selection screen (see FIG. 17), is displayed. The player selects the desired pachislo machine within the area by clicking that machine on the machine selection screen, the selected pachislo machine's screen (play screen) is displayed on the display part 24 of PC 53A that the player uses (steps A3 to A7).

Figure 36:
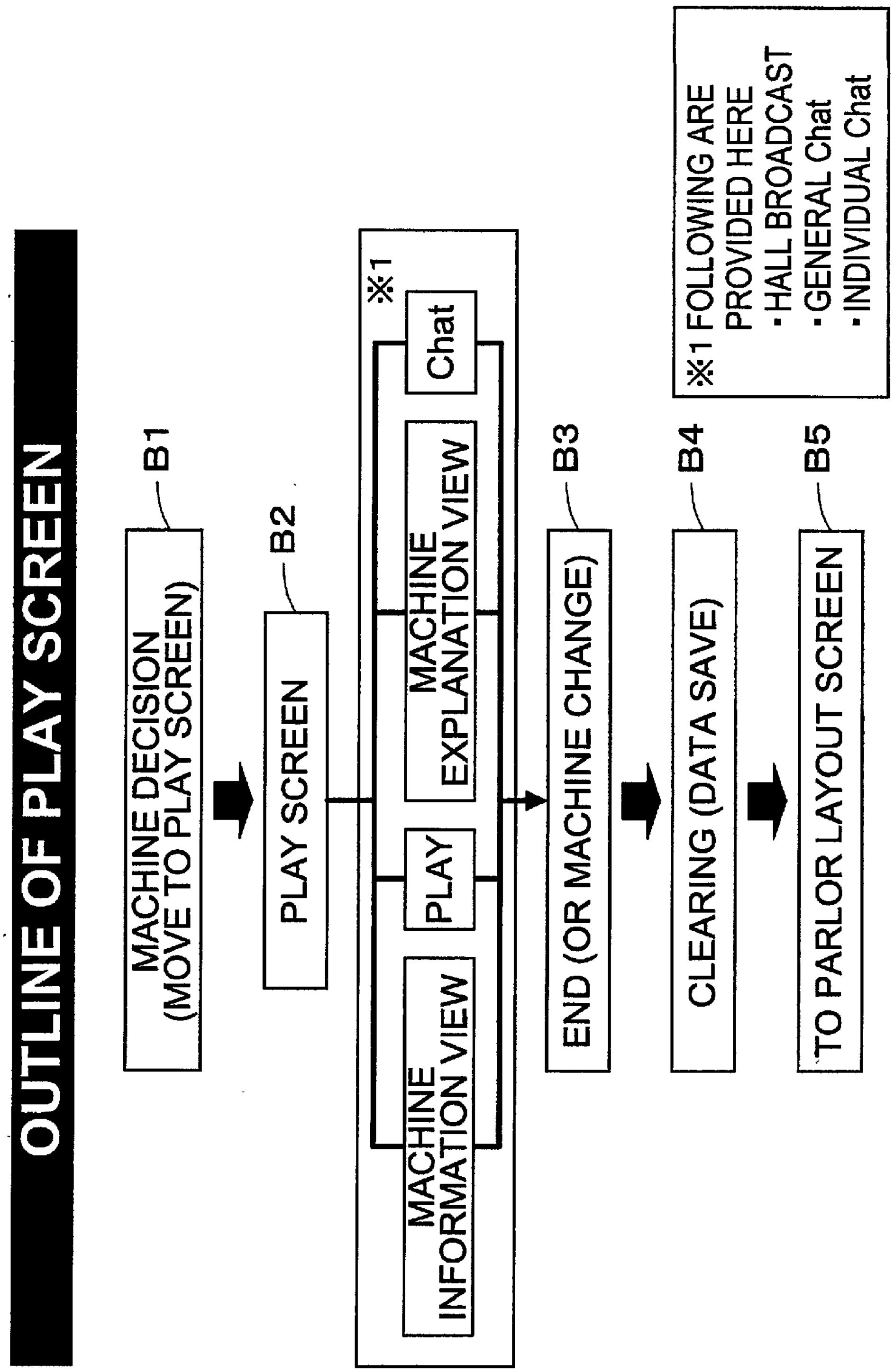
FIG. 36 is a conceptual diagram for explaining the outline of play screen.

Outline of this play screen is shown in FIG. 36. Referring to FIG. 36, deciding the machine (step B1), play screen is displayed on the display part 24 (step B2). On this screen, the player can select one or more of the followings: i) machine information view, ii) play, iii) machine explanation view, and iv) chat. When the player terminates play of pachislo game (step B3), the server 17A performs clear and saves data in the database 34 (step B4), thereby returning to the parlor layout screen (machine selection screen) (step B5).

Figure 37:
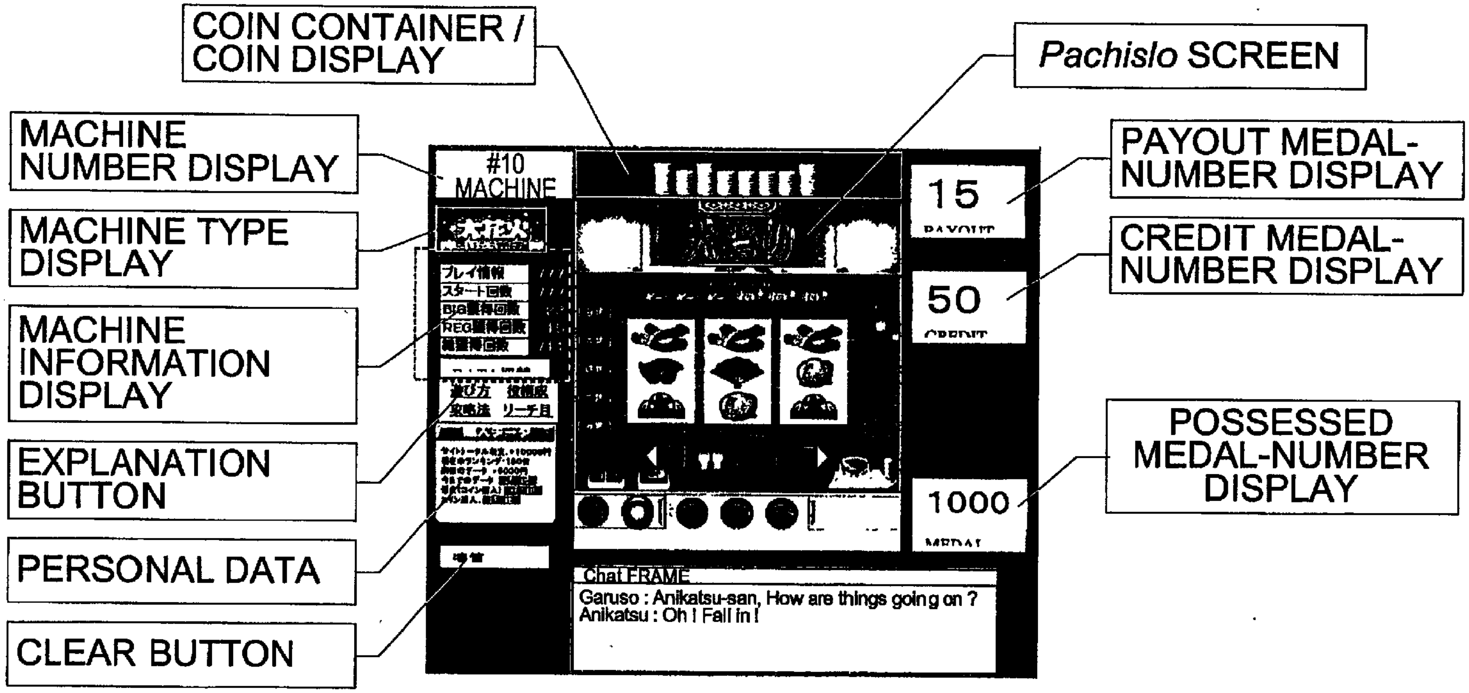

FIG. 37 is a diagram showing, in simplified form, a play screen according to image of pachislo machine. Referring to FIG. 37, the image of pachislo machine that the player plays is displayed on the play screen. In addition to this, as shown in FIG. 38, the play screen includes the followings: i) coin container/coin display that roughly shows the present possessed medal-number in coin or coin container image, ii) machine number display that shows the machine number of currently selected machine, iii) machine type display that shows the type of currently selected machine, iv) machine information display that shows various data of the machine (e.g., the number of STARTs, and the number of big-hits, v) explanation-button display that shows information about the machine (play method, attack method, etc.), vi) personal data display that shows personal balance in the whole parlor on site, and vii) clear-button display that is used for terminating pachislo game. As shown in FIG. 39, the play screen further includes the followings: i) display of medal-number that is paid out during play of pachislo machine, ii) display of medal-number that the player debited to the pachislo machine, and iii) display of medal-number balance that the player obtained with the pachislo machine (i.e., medal-number that the player possesses currently).

Figure 40:
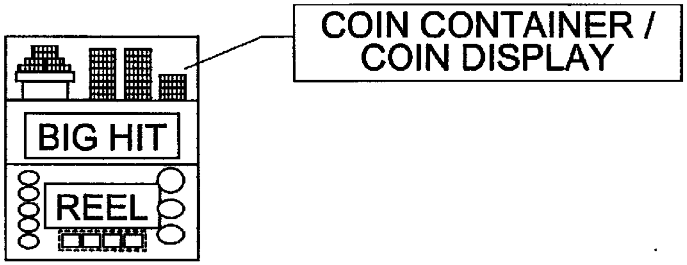
FIG. 40 is a conceptual diagram for explaining a coin container/coin display screen.

FIG. 40 shows an example of display of coin container/coin display in the play screen. From this display style, the player can roughly understand the number of medals obtained with the machine.

Figure 41:
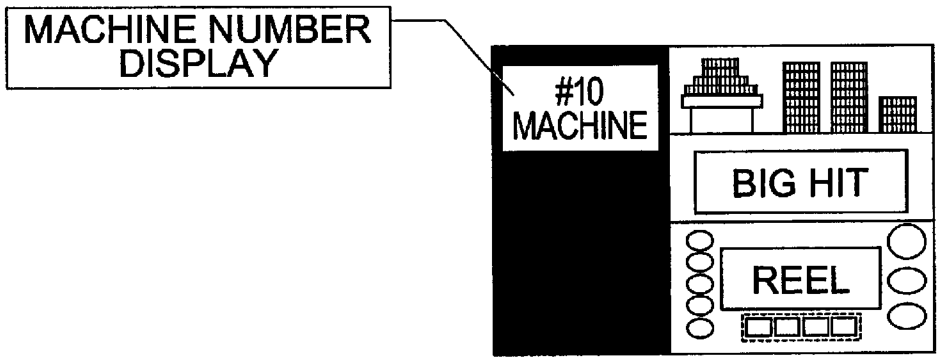

FIG. 41 shows an example of machine number display on the play screen. From this display style, the player can understand the machine number of pachislo machine that is displayed as play screen.

Figure 42:
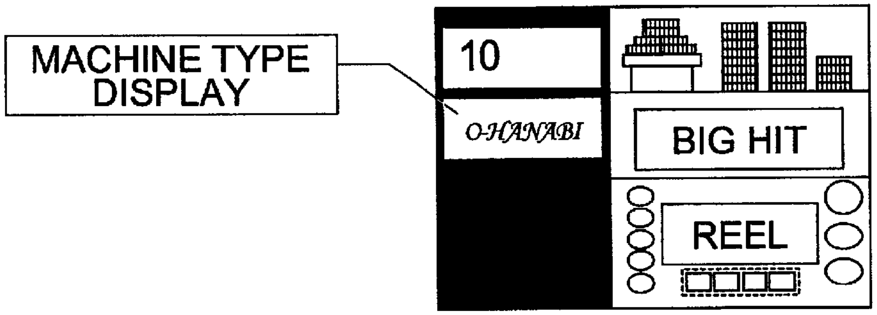

FIG. 42 shows an example of machine-type display on the play screen. From this display style, the player can understand the machine type of pachislo machine that is displayed as play screen.

FIG. 43 shows an example of machine-information display on the play screen. From this display style, the player can understand various information (the number of STARTs, big-hits, etc.) of pachislo machine that is displayed as play screen.

In the above-mentioned machine information display, as shown in FIG. 44, machine information is retained in the database 34 of the server 17A, even when the player of the pachislo machine is changed.

FIG. 45 shows an example of explanation-button display on the play screen. From this display style, the player can understand basic play method and attack method of pachislo machine that is displayed as play screen.

FIG. 46 shows an example of personal data display on the play screen. From this display, the player can understand personal balance in the whole parlor on site. Details of site total-balance displayed as personal data is, as shown in FIG. 47, calculated based on the amount of coins obtained by pachislo game and the amount of coin purchase. Thereafter, as shown in FIG. 48, the player's ranking is decided based on the total balance.

The above-mentioned personal data is, as shown in FIG. 49, displayed by reading the previous data (the balance of previous pachislo play on site) from the database 34.

Figure 50:
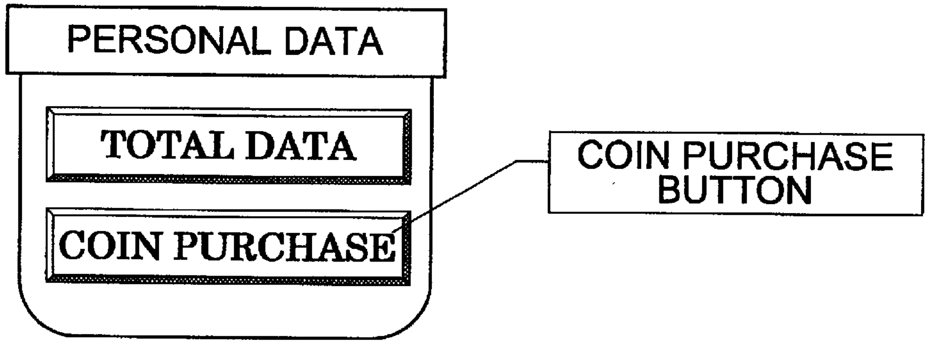

FIG. 50 shows an example of coin-purchase button display on the play screen. By operating this button, the player can purchase the desired number of coins.

Figure 51:
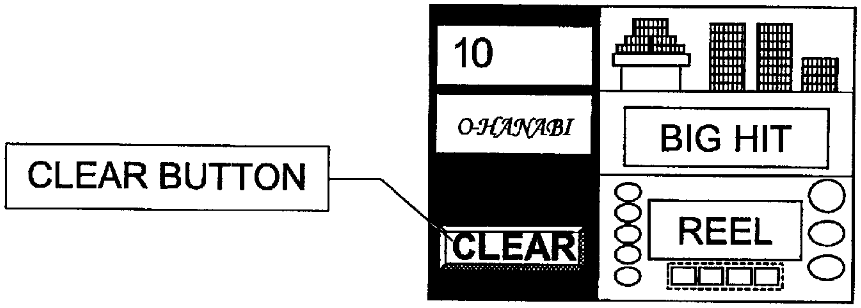
FIG. 51 is a conceptual diagram for explaining a clear button display screen.

FIG. 51 shows an example of clear-button display on the play screen. By operating this button, the player can terminate pachislo play and perform clearing.

Figure 52:
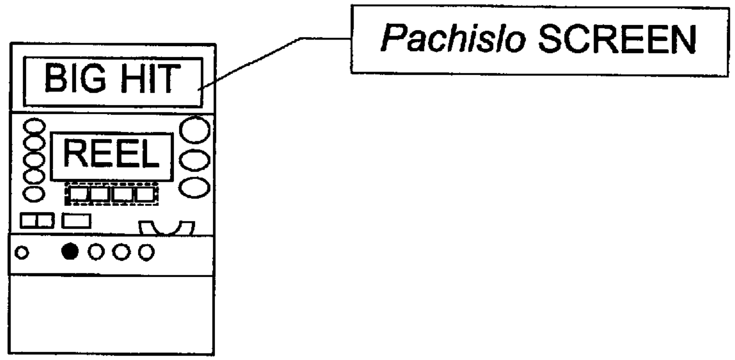
FIG. 52 is a conceptual diagram for explaining a pachislo display screen.

FIG. 52 shows an example of pachislo display on the play screen. This display style is designed to give realistic impression to the player by using the same image as actual machine.

Figure 53:
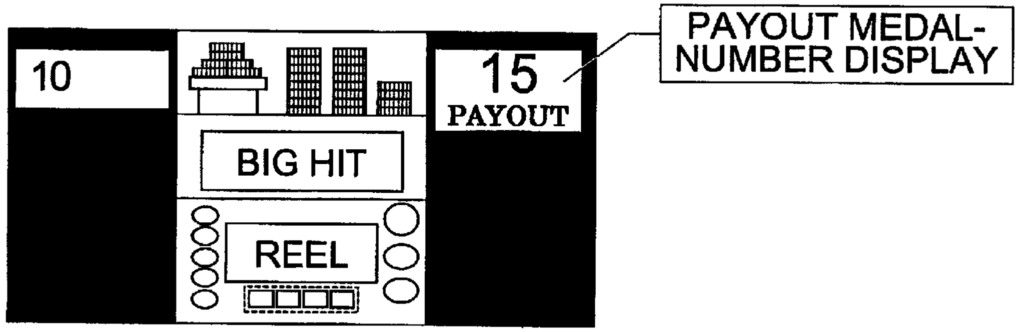
FIG. 53 is a conceptual diagram for explaining a payout medal-number display screen.

FIG. 53 shows an example of payout medal-number display on the play screen. From this display style, the player can understand the number of medals paid out during pachislo game.

Figure 54:
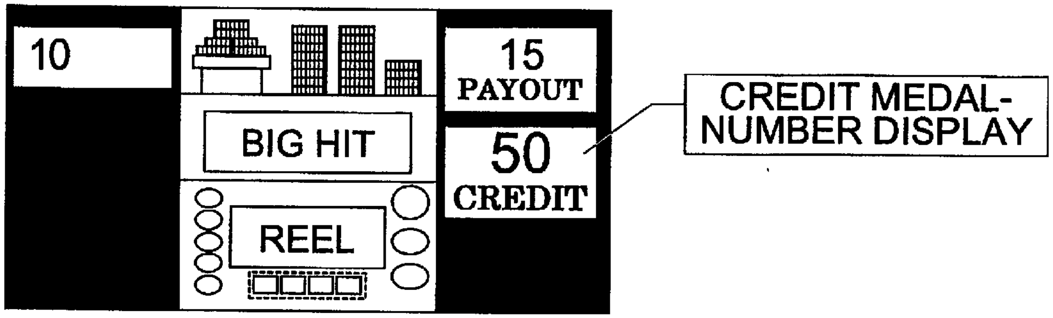
FIG. 54 is a conceptual diagram for explaining a credit medal-number display screen.

FIG. 54 shows an example of debit medal-number display on the play screen. From this display style, the player can understand the number of medals debited to pachislo game.

Figure 55:
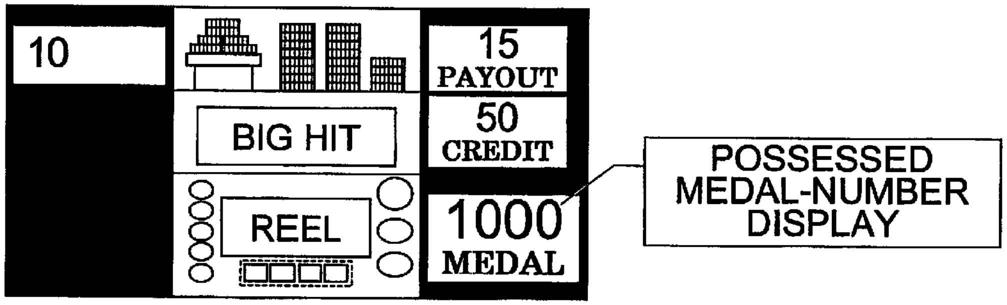
FIG. 55 is a conceptual diagram for explaining a possessed medal-number display screen.

FIG. 55 shows an example of possessed medal-number display on the play screen. From this display style, the player can understand the number of possessed medals.

Figure 56:
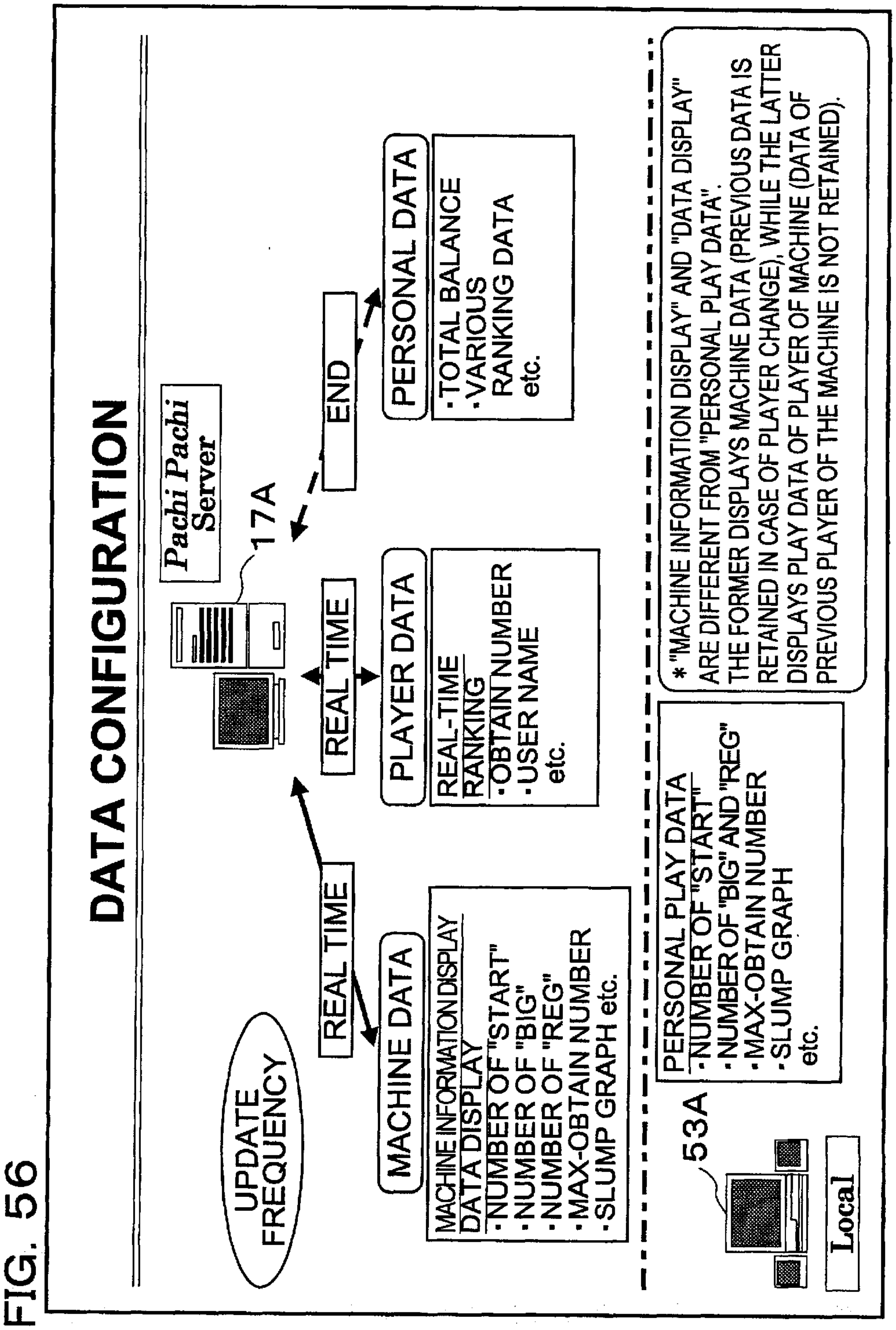
FIG. 56 is a conceptual diagram for explaining the data configuration of site.

FIG. 56 shows the whole configuration of data used for playing pachislo game. Referring to FIG. 56, data of pachislo machine and data of obtained medal-number, ranking, etc. of the player, are sent to the server 17A and updated in real time. On the other hand, personal data such as balance is sent to the server 17A and updated after play.

[Provision of Contents Using Face Image]

On the above-mentioned site for playing pachislo game, as previously described with reference to FIG. 9, face image as the personal information of the entry player, which is stored in the database 34, changes according to the player's ranking. By watching such face image change, when starting a battle game, etc., the player can roughly understand the competitor's skill-level. That is, when a certain player performs a battle game with others, the player selects the battle mode by operating his/her own PC. In this battle mode, the server 17A reads the face image of the entry player from its database 34, and this face image is downloaded to the PC. This face image changes according to player's ranking, thereby a certain player who demands a battle game can determine the desired competitor based on the competitor's face image. When the player designates the desired competitor on the PC, the result is sent from the PC to the server 17A. The server 17A receives this information and sends a message (information), saying that there is a battle game demand, to the designated competitor. The competitor receives this information and, when the competitor accepts this battle game demand by operating his/her own PC, the result is forwarded to the server 17A. As a result, the competitor is determined, and the battle game is started by the server 17A. It should be noted that, without limiting this battle to between one player and the other, it can be performed among a plurality of players. In the battle game of this style, a plurality of players perform pachislo game for a predetermined period of time, and the player having the largest number of obtained medals becomes the winner. Following is another method of selecting the competitor. On the machine selection screen previously described with reference to FIG. 17, any player can make an application for a battle game by clicking the face image of the player of pachislo machine in use (user display). On each machine display, the player's face image is displayed by face image according to the player's ranking. Also in this method, the server 17A, receiving the competitor designation from the player's PC, sends the designated competitor a message describing it to notify that other player made the application for a battle game demand.

Figure 57:
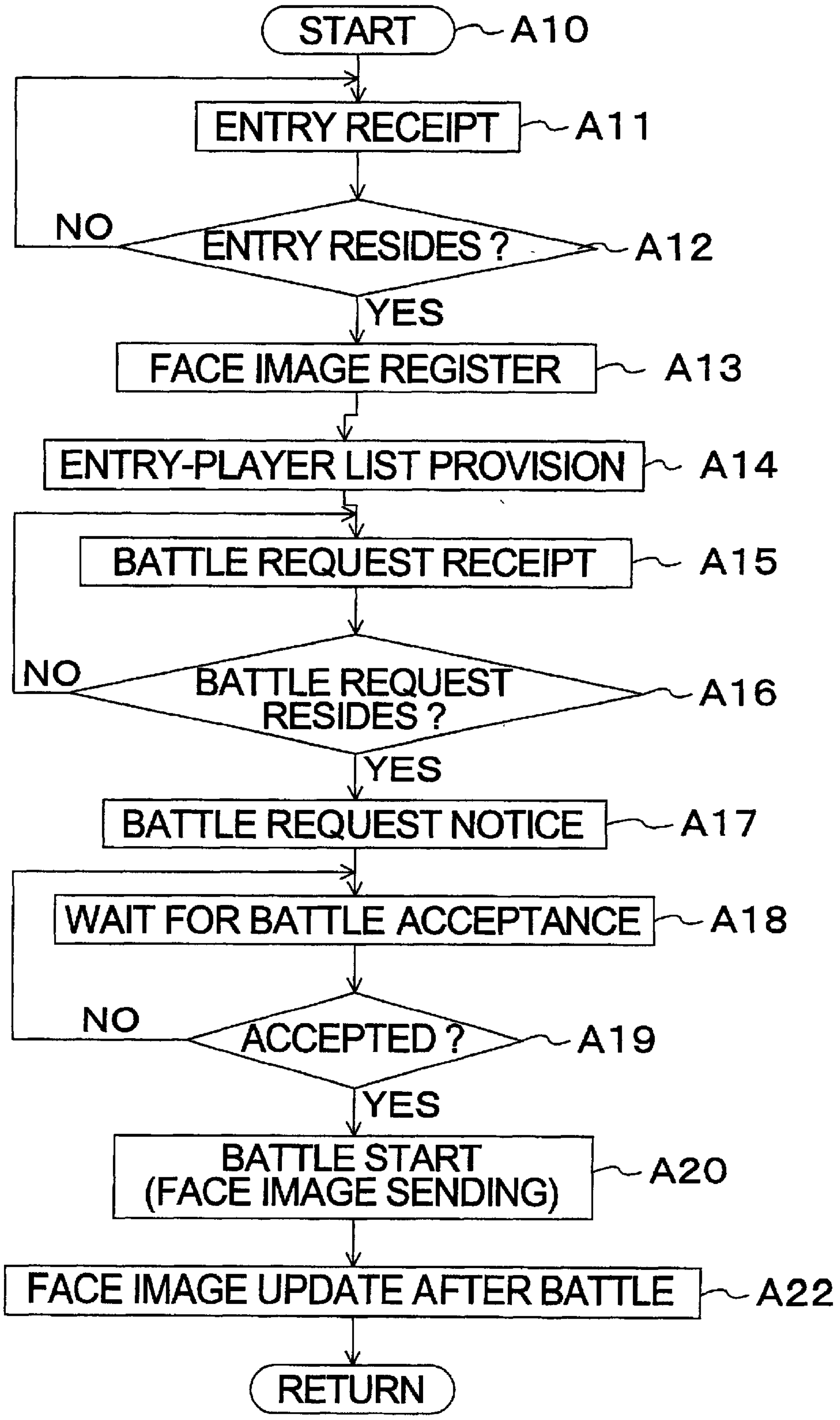
FIG. 57 is a flowchart showing the procedure of providing contents using face image.

FIG. 57 is a flowchart showing the processing procedure according to characteristic features of the present invention which are related to contents-providing using face image, from personal information registration to battle game play. Program for executing this flowchart is stored in the database 34 of the server 17A, and the CPU 31 of the server 17A expands this program on the memory 32 and executes it.

Referring to FIG. 57, the server 17A executes the above-mentioned processing procedure from step A10, and goes into entry-receiving status in step A11.

On receipt of entry from one player's PC, the server 17A waits a positive response from the other player's PC (step A12). Receiving the positive response, the server 17A goes to the processing in step A13. In step A13, the server 17A registers, in the database 34, one player's personal information sent from one player side PC, as well as one player's face image. When one player is a beginner, such a beginner's face image that is previously stored in the database 34 is used as this player's face image. When one player is already a ranking holder on the site, this player's history is searched from the database 34 and, based on the ranking, the corresponding face image stored in the database 34 is used.

Finishing the face image registration, the server 17A goes to the processing in step A14. In step A14, the server 17A provides a list of registered players on demand from the other player. This list is attached to the face images of the registered players. Viewing this list, the other player understands each player's skill-level based on the corresponding face image. For instance, while watching this list, the other player selects a competitor, as described with reference to FIG. 12, or joins winner-forecasting game. As a result, the player can select the competitor based on the competitor's skill-level.

Thereafter, in step A15, the server 17A receives an application for battle. Receiving the application, the server 17A goes to the processing from step A16 to step A17. In step A17, the server 17A sends the waiting player's (one player's) PC a message describing that the other player made the application. In step A18, the server 17A waits for the battle acceptance signal from the player that is the message destination. Receiving the acceptance signal, the server 17A goes to the processing from step A19 to step A20. In step A20, the server 17A starts the battle. This battle is designed, for example, to play pachislo game for a predetermined period of time and determine the winner based on the number of obtained medals. During this battle, the server 17A sends each competitor's face image (one player's face image to the other player, and the other player's face image to one player). As a result, both players can play game while recognizing the opponent skill-level with each other.

At the end of the battle game, the server 17A goes to the processing in step A21. In step A21, the server 17A updates each player's ranking according to the battle result, and updates, according to the update result, player's face image based on the new ranking.

At the completion of a chain of processing procedures, the server 17A returns from step A22 to whole-site control routine.

As stated above, the player's face image changes according to the ranking (skill-level), thereby others can select the competitor on the basis of the skill-level. In this connection, the player's face image is also used for the player display during play, on the parlor screen previously described with reference to FIG. 17. Therefore, it is also possible that when a certain player asks others for assist in "observation push (aiming), etc., the player can select an assistant on the basis of his/her face image.

[Game-Watch Service]

Other player's play can be watched on the pachislo battle game previously described with reference to FIG. 12, and parlor screen (machine selection screen) previously described with reference to FIG. 17.

Figure 58:
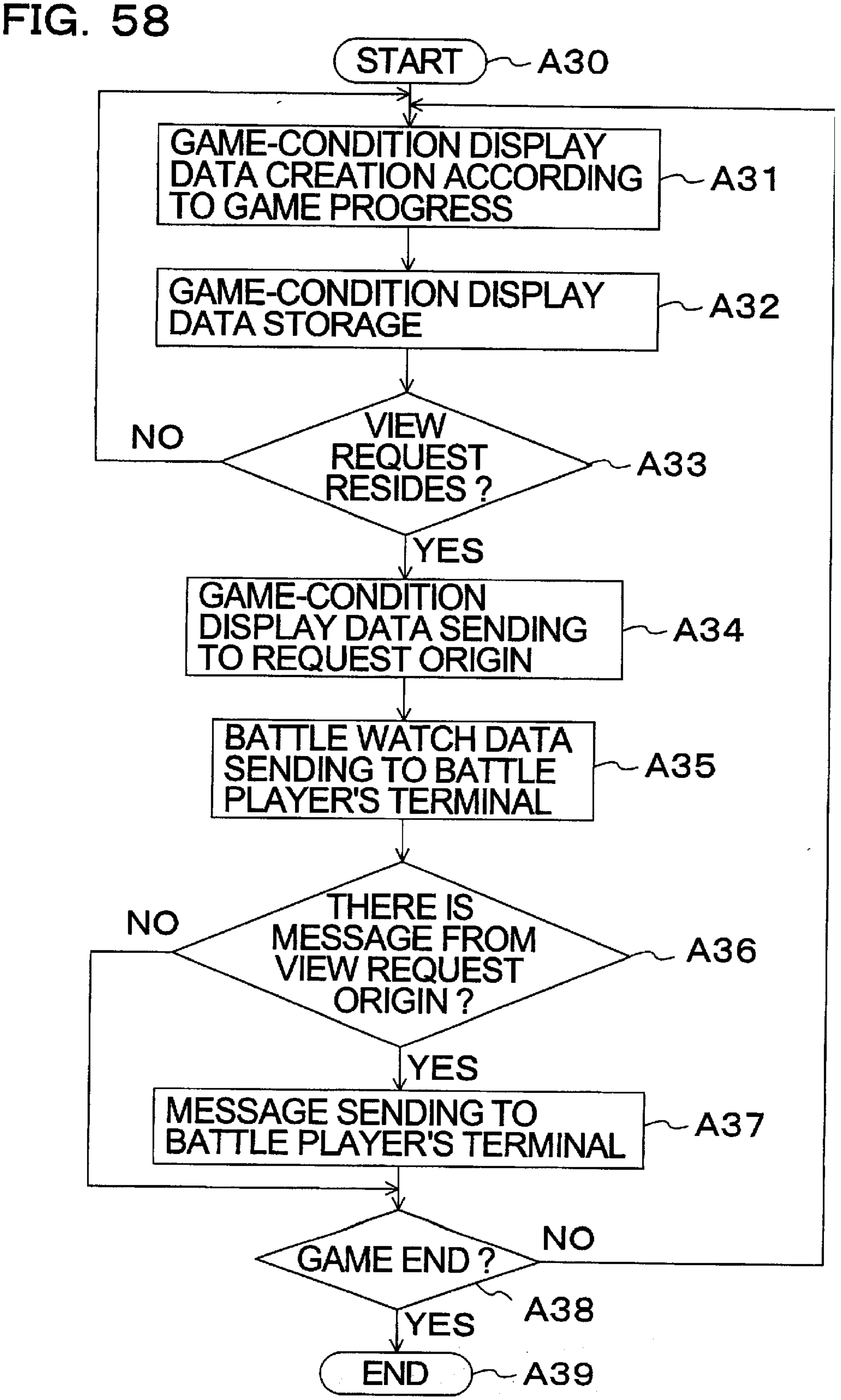
FIG. 58 is a flowchart showing the procedure of processing a battle-watch mode by other player.

FIG. 58 is a flowchart showing the processing procedure of server that provides service for watching other player's play and battle game. Program for executing this flowchart is stored in the database 34 of the server 17A, and the CPU 31 of the server 17A expands this program on the memory 32 and executes it. A conversation between a game watcher and a player of which play is watched is performed in chat style, through the server 17A.

Referring to FIG. 58, the server 17A goes into the above-mentioned processing procedure from step A30, and goes to the processing in step A31. In step A31, the server 17A creates a display data of game circumstances based on the game circumstances sent from the PCs 53A, 53B, 53C, . . . , in accordance with the progress of each player's pachislo game, and stores the created data in the database 34.

Then, the database 34 of the server 17A stores the latest play circumstances of each player (step A32). When one player demands a view of the other player's data, the server 17A goes to the processing from step A33 to step A34. In step A34, the server 17A sends the view-demand origin a game-circumstance display data of each player in play. In this connection, when performing a view demand, it is necessary to designate a candidate player. Player-designation can be performed by the following methods: i) clicking a pachislo machine in the play state or the player's image attached to the machine display, on the parlor layout screen previously described with reference to FIG. 17; and ii) clicking one of players who compete with each other in a battle game. The PC of the player having a game-watch demand sends a demand together with the player's password that is preset to the server 17A. Even when a certain player other than the play-state player accesses to the server 17A, the play screen of the play-sate player can be read and provided by receiving the certain player's password, etc. As the result, on the display part 24 of the PC of the player who sent the view demand, there is displayed, for example, the play screen of the player who was designated during play, as shown in FIG. 37.

Thus, while the play contents of the playing one player is watched by the other player, the server 17A sends a message describing that "Your play is being watched." to the PC of one player, in step A35. One player can recognize as being watched, by this message, which is displayed on the display part 24.

The other player, who watches the first player's play by sending the game-watch demand, can send various messages to the first payer. In this case, inputting a message through PC by the other player, this message is sent to the server 17A. Receiving this message, the server 17A goes to the processing from step A36 to step A37. In step A37, the server 17A sends one player (of which play is being watched). Then, a message (e.g., catcalling, cheering, or advice) from the other player is displayed on the display part 24 of one player (i.e., the chat frame previously described with reference to FIG. 17). The server 17A recognizes the addresses of terminal devices (e.g., PCs) of the both players, thereby one player can also send a reply to this message.

At the end of one player's play, the server 17A goes to the processing from step A38 to step A39, thereby completing the foregoing processing procedure.

As stated above, it is possible to watch the play of the other player, as well as message exchange between one player of which play is watched and the other watching the player's play. As the result, the players can experience such actuality that they were playing pachislo at an actual hall.

Figure 59:
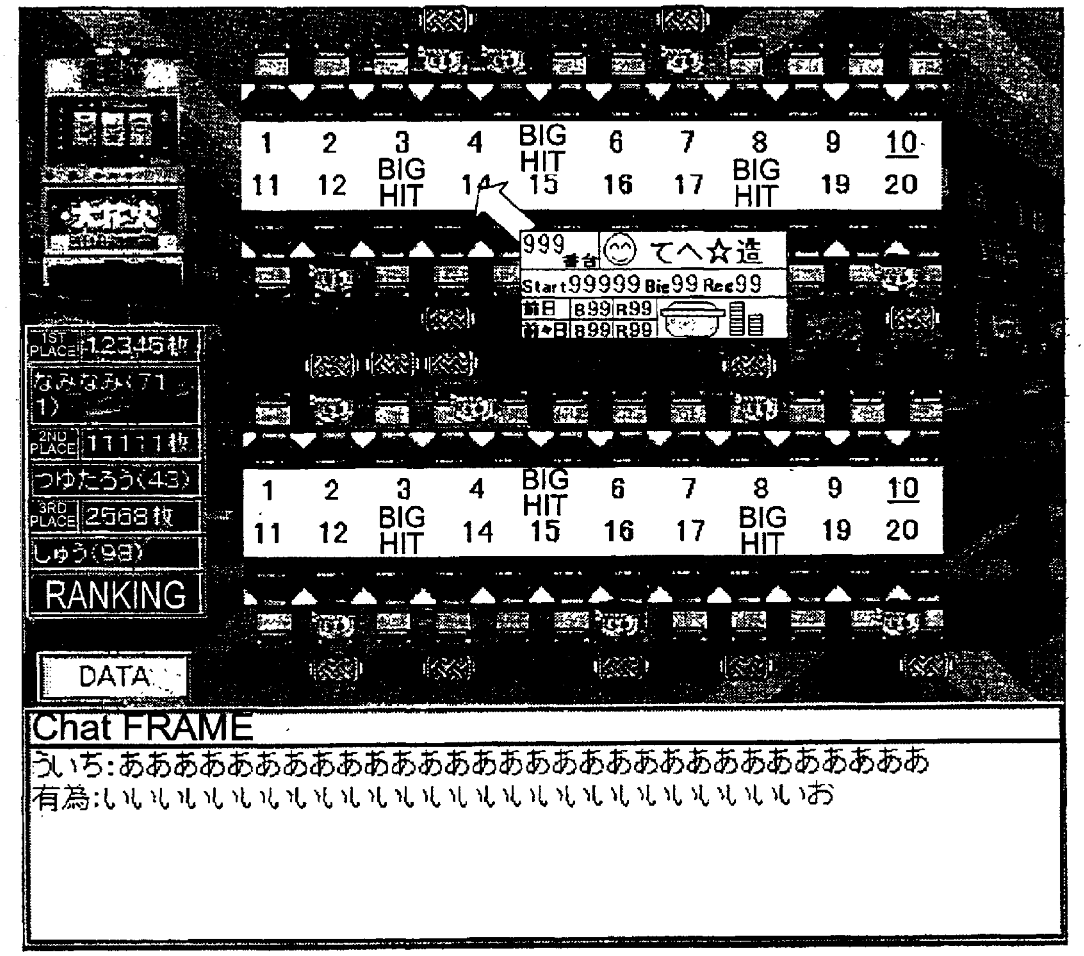
FIG. 59 shows an example of actual display of the machine selection screen in the interior of parlor.

For reference, FIG. 59 shows an example of actual display of the parlor layout screen (machine selection screen), which has been described with reference to FIG. 17. Conversations between players, hall broadcast, etc., are displayed on the chat frame of this display.

[Operations and Effects]

The foregoing preferred embodiment produces mainly the following operations and effects.

(1) A game player connects to a server through a terminal and plays a game on the server. Before playing the game on the server, the face image information of the game player is registered as personal information. This face image information changes according to the game result. The changed face-image information is used as the player's face image information at the next game. That is, in addition to address, name, or pen name, which has conventionally been registered in advance as personal information, face image information is registered and changed according to the game result. Therefore, this permits a quick visual recognition of the previous game result. Furthermore, the face image changes continuously as the number of games is increased. Hence, when the player plays a battle game, only glancing the competitor's face image, it can visually and sensibly understand whether the competitor has high skill level or not.

(2) A plurality of game players connect to a server through their respective terminals, and the game players play a battle game on the server. Before playing the battle game on the server, their face image information are registered in the server, as personal information. Their respective face image information are changed by the server every time when the corresponding player plays a battle game, according to the game result. When a plurality of players perform a battle game on the server, the stored face image of the corresponding player is sent to the terminal of the opponent player. Hence, only glancing the competitor's face image, the players can play a battle game after roughly recognizing the competitor's skill-level.

(3) The above-mentioned face image information is sent to the respective player terminals before starting the battle game, together with a list information of players who are accepted as the competitor and capable of playing a battle game. Therefore, before the battle game, the players can play the game after roughly recognizing the competitor's skill-level, in order words, by selecting the competitor. As the result, without reference-operation of the competitor's battle history, etc., the competitor's skill-level can be understood only by glancing the face image.

(4) When performing a battle game as a game, it is configured to receive entry for a battle game from a plurality of game players who are previously entered on a server and capable of joining the game. The terminal through which one player performed the entry for the battle game is notified that there is other entry player, and then an acceptance from the terminal is received. On receipt of the acceptance, the battle game execution is permitted. Therefore, both players are capable of selecting the competitor. In other words, the choice range of competitors is wide. Specifically, when playing a battle game, it is more amusing for game players to battle with competitors of equal skill level. It is however inconvenient for game players demanding a battle game with a strong competitor that a game player of the same skill level is evenly and forcedly assigned. This inconvenience is not limited to game players of relatively low skill level, because even game players of high skill level may sometimes desire to accept a battle game with a low-skill game player. Without making the server forcedly select the competitor (the server side has not pick of the choices), allowing game players to select the competitor can solve the above problem.

What is claimed is:

1. A game method with which a game player connects to a server by using a terminal and plays a game on the server, the method including the steps of:

before starting the game on the server, making the game player register a face image information as personal information;

changing the face image information according to the game result; and using the changed face image information as face information of the next game.

2. The game method according to claim 1 in which a network is used, further including the step of:

before starting the game, sending the terminals the face image information together with a list information of game players who are entered as competitor and capable of playing a battle game.

3. The game method according to claim 1 in which a network is used, the method further including, when the game is a battle game, the steps of:

receiving in advance entry for the battle to a plurality of game players who are entered on the server and capable of playing the battle game;

notifying the terminal of the other player receiving the battle entry as competitor that the entry was performed from one player, and receiving an acceptance of the battle from the notified terminal; and permitting execution of the battle game at the receipt of the acceptance.

4. The game method according to claim 2 in which a network is used, the method further including, when the game is a battle game, the steps of:

receiving in advance entry for the battle to a plurality of game players who are entered on the server and capable of playing the battle game;

notifying the terminal of the other player receiving the battle entry as competitor that the entry was performed from one player, and receiving an acceptance of the battle from the notified terminal; and permitting execution of the battle game at the receipt of the acceptance.

5. A game method with which a plurality of game players connect to a server by using a terminal and play a battle game on the server, the method including the steps of:

before starting the battle game on the server, making the game players register a face image information as personal information in a memory part with the server;

changing the face image information every time a control part with the server executes the battle game, according to the game result; and when the game players play a battle game on the server, sending the respective players' face image stored in the memory part to the terminals of the game players who complete the entry in the battle game.

6. The game method according to claim 5 in which a network is used, further including the step of:

before starting the game, sending the terminals the face image information together with a list information of game players who are entered as competitor and capable of playing a battle game.

7. The game method according to claim 5 in which a network is used, the method further including, when the game is a battle game, the steps of:

receiving in advance entry for the battle to a plurality of game players who are entered on the server and capable of playing the battle game;

notifying the terminal of the other player receiving the battle entry as competitorm that the entry was performed from one player, and receiving an acceptance of the battle from the notified terminal; and permitting execution of the battle game at the receipt of the acceptance.

8. The game method according to claim 6 in which a network is used, the method further including, when the game is a battle game, the steps of:

receiving in advance entry for the battle to a plurality of game players who are entered on the server and capable of playing the battle game;

notifying the terminal of the other player receiving the battle entry as competitor that the entry was performed from one player, and receiving an acceptance of the battle from the notified terminal; and permitting execution of the battle game at the receipt of the acceptance.

9. A program storage medium used when a game player connects to a server by using a terminal and plays a game on the server, the program storage medium storing:

a program for making, before starting the game on the server, the game player register a face image information as personal information;

a program for changing the face image information according to the game result; and a program for using the changed face image information as face information of the next game.

10. The program storage medium according to claim 9 further storing:

a program for sending, before starting the game, the terminals the face image information together with a list information of game players who are entered as competitor and capable of playing a battle game.

11. The program storage medium according to claim 9 further storing, when the game is a battle game, a program for receiving in advance entry for the battle to a plurality of game players who are entered on the server and capable of playing the battle game;

a program for notifying the terminal of the other player receiving the battle entry as competitor that the entry was performed from one player, and receiving an acceptance of the battle from the notified terminal; and a program for permitting execution of the battle game at the receipt of the acceptance.

12. The program storage medium according to claim 10 further storing, when the game is a battle game, a program for receiving in advance entry for the battle to a plurality of game players who are entered on the server and capable of playing the battle game;

a program for notifying the terminal of the other player receiving the battle entry as competitor that the entry was performed from one player, and receiving an acceptance of the battle from the notified terminal; and a program for permitting execution of the battle game at the receipt of the acceptance.

13. A program storage medium used when a plurality of game players connect to a server by using a terminal and play a battle game on the server, the program storage medium storing:

a program for making, before starting the battle game on the server, the game players register a face image information as personal information in a memory part with the server;

a program for changing the face image information every time a control part with the server executes the battle game, according to the game result; and a program for sending, when the game players play a battle game on the server, the respective players' face image stored in the memory part to the terminals of the game players who complete the entry in the battle game.

14. The program storage medium according to claim 13 further storing:

a program for sending, before starting the game, the respective terminal the face image information together with a list information of game players who are entered as competitor and capable of playing the battle game.

15. The program storage medium according to claim 13 further storing, when the game is a battle game:

a program for receiving in advance entry for the battle game from a plurality of game players who are entered on the server and capable of playing the battle game;

a program for notifying the terminal of the other player receiving the battle entry as competitor that the entry was performed from one player, and receiving an acceptance of the battle from the notified terminal; and a program for permitting execution of the battle game at the receipt of the acceptance.

16. The program storage medium according to claim 14 further storing, when the game is a battle game:

a program for receiving in advance entry for the battle game from a plurality of game players who are entered on the server and capable of playing the battle game;

a program for notifying the terminal of the other player receiving the battle entry as competitor that the entry was performed from one player, and receiving an acceptance of the battle from the notified terminal; and a program for permitting execution of the battle game at the receipt of the acceptance.

17. A server for playing a game via a network, to which a plurality of game players are connectable through a terminal, the server including:

means for making, before starting the game on the server, the game players register a face image information as personal information;

means for changing the face image information according to the game result; and means for using the changed face image information as face information of the next game.

18. The server according to claim 17 further including:

means for sending, before starting the game, the respective terminal the face image information together with a list information of game players who are entered as competitor and capable of playing the battle game.

19. The server according to claim 17 further including, when the game is a battle game:

means for receiving in advance entry for the battle game from a plurality of game players who are entered on the server and capable of playing the battle game;

means for notifying the terminal of the other player receiving the battle entry as competitor that the entry was performed from one player, and receiving an acceptance of the battle from the notified terminal; and means for permitting execution of the battle game at the receipt of the acceptance.

20. The server according to claim 18 further including, when the game is a battle game:

means for receiving in advance entry for the battle game from a plurality of game players who are entered on the server and capable of playing the battle game;

means for notifying the terminal of the other player receiving the battle entry as competitor that the entry was performed from one player, and receiving an acceptance of the battle from the notified terminal; and means for permitting execution of the battle game at the receipt of the acceptance.

21. A server for playing a game via a network, to which a plurality of game players are connectable through a terminal, the server including:

means for making, before starting a battle game on the server, the game players register a face image information as personal information in a memory part with the server;

means for changing the face image information every time a control part of the server executes the battle game, according to the game result; and means for sending, when the game players play the battle game on the server, the respective players' face image stored in the memory part to the terminals of the game players who complete the entry in the battle game.

22. The server according to claim 21 further including:

means for sending, before starting the game, the respective terminals the face image information together with a list information of game players who are accepted as competitor and capable of playing the game.

23. The server according to claim 21 further including:

means for receiving in advance, when the game is a battle game, entry for the battle game to a plurality of game players who are entered on the server and capable of playing the battle game;

means for notifying the terminal of the other player receiving the battle entry as competitor that the entry was per formed from one player, and receiving an acceptance of the battle from the notified terminal; and means for permitting execution of the battle game at the receipt of the acceptance.

24. The server according to claim 22 further including:

means for receiving in advance, when the game is a battle game, entry for the battle game to a plurality of game players who are entered on the server and capable of playing the battle game;

means for notifying the terminal of the other player receiving the battle entry as competitor that the entry was performed from one player, and receiving an acceptance of the battle from the notified terminal; and means for permitting execution of the battle game at the receipt of the acceptance.

* * * * *